United States Patent [19]

Imaizumi et al.

[11] Patent Number: 5,452,057
[45] Date of Patent: Sep. 19, 1995

[54] IMAGE PROCESSOR PERMITTING RESETTING OPERATION WHILE MAINTAINING DESIRED OPERATION MODE

[75] Inventors: Shoji Imaizumi, Shinshiro; Kenichi Muroki, Yamaguchi; Keiji Kusumoto, Toyokawa, all of Japan

[73] Assignee: Minolta Camera Kabushiki Kaisha, Osaka, Japan

[21] Appl. No.: 63,527

[22] Filed: May 18, 1993

[30] Foreign Application Priority Data

May 19, 1992 [JP] Japan .................................. 4-152792

[51] Int. Cl.6 ........................................... G03G 21/00
[52] U.S. Cl. .................................. 355/204; 355/202; 355/206; 355/208; 355/209
[58] Field of Search ................ 355/202, 203, 204, 208, 355/209, 206

[56] References Cited

U.S. PATENT DOCUMENTS

| 4,821,107 | 4/1989 | Naito et al. .................... 355/202 X |
| 4,922,295 | 5/1990 | Takano et al. .................. 355/209 |
| 4,958,188 | 9/1990 | Miyamoto ....................... 355/206 |
| 5,200,778 | 4/1993 | Ito ................................ 355/204 |
| 5,214,772 | 5/1993 | Weinberger et al. ........... 355/204 X |

*Primary Examiner*—Matthew S. Smith
*Attorney, Agent, or Firm*—Willian Brinks Hofer Gilson & Lione

[57] ABSTRACT

In an image processor capable of setting operation modes separately for a plurality of items related to image processing, it can be designated whether or not to reset the operation mode of each item to an initial mode. The designated data is stored in a resetting/not resetting memory. In the apparatus, when a batch reset processing is instructed, only an item authorized to be reset according to the data stored in the memory is reset to the initial mode. As a result, even if the batch reset instruction is executed, a desired operation mode is not reset.

1 Claim, 23 Drawing Sheets

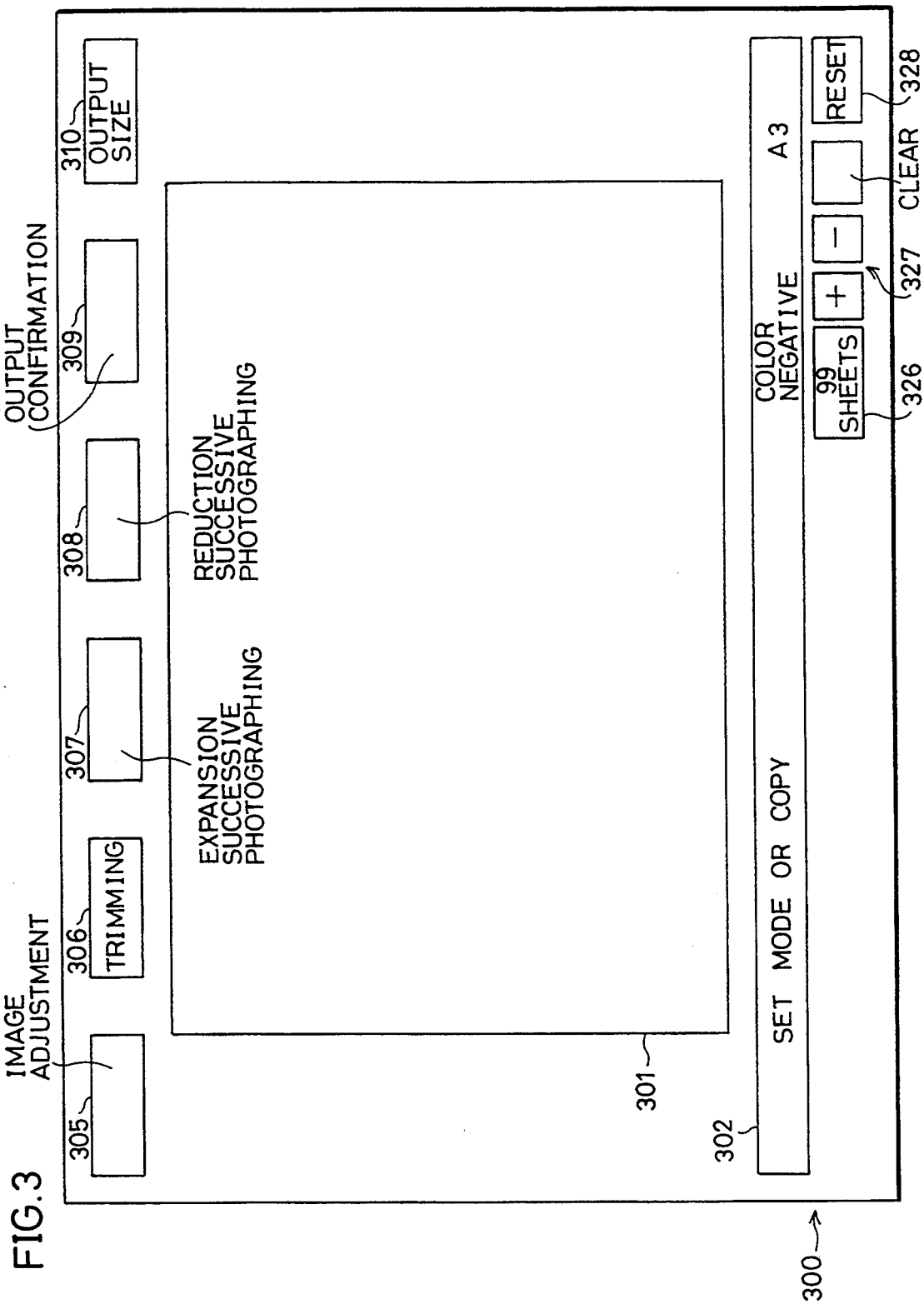

FIG.12
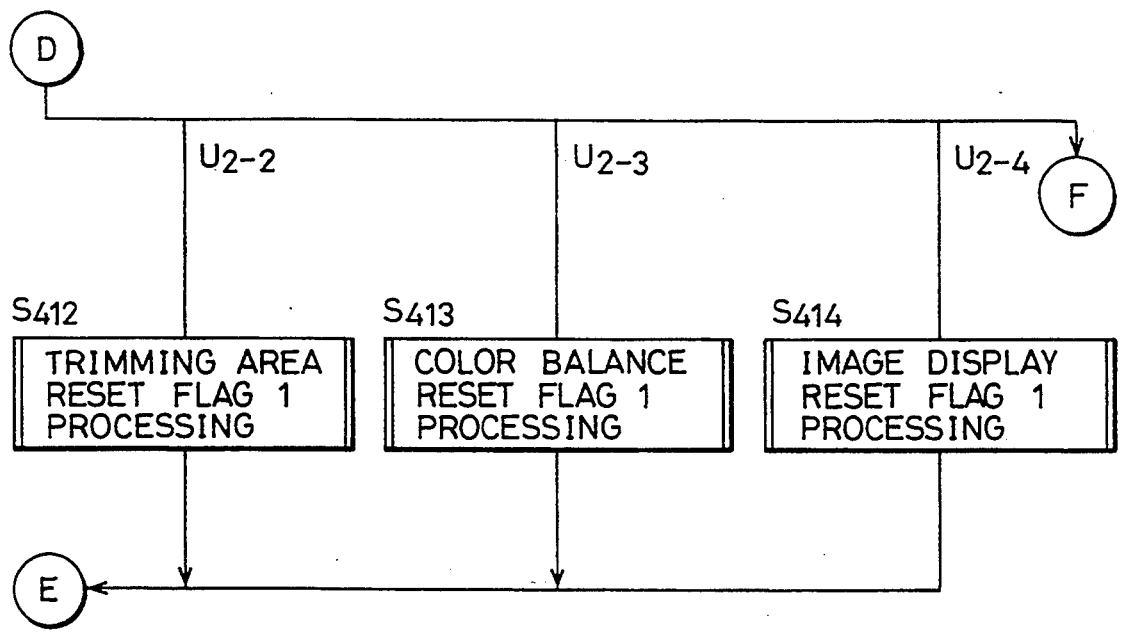
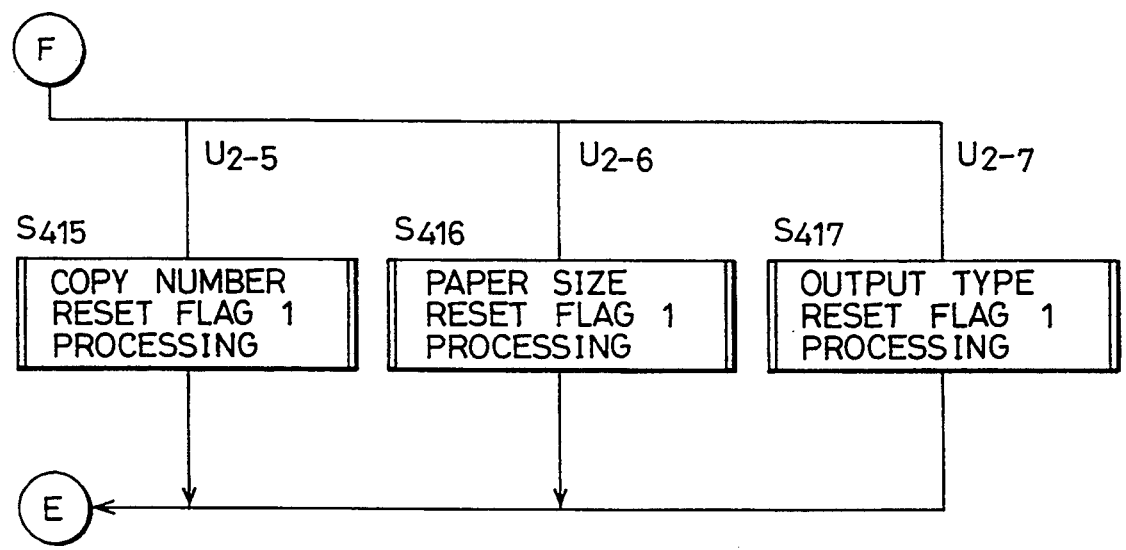

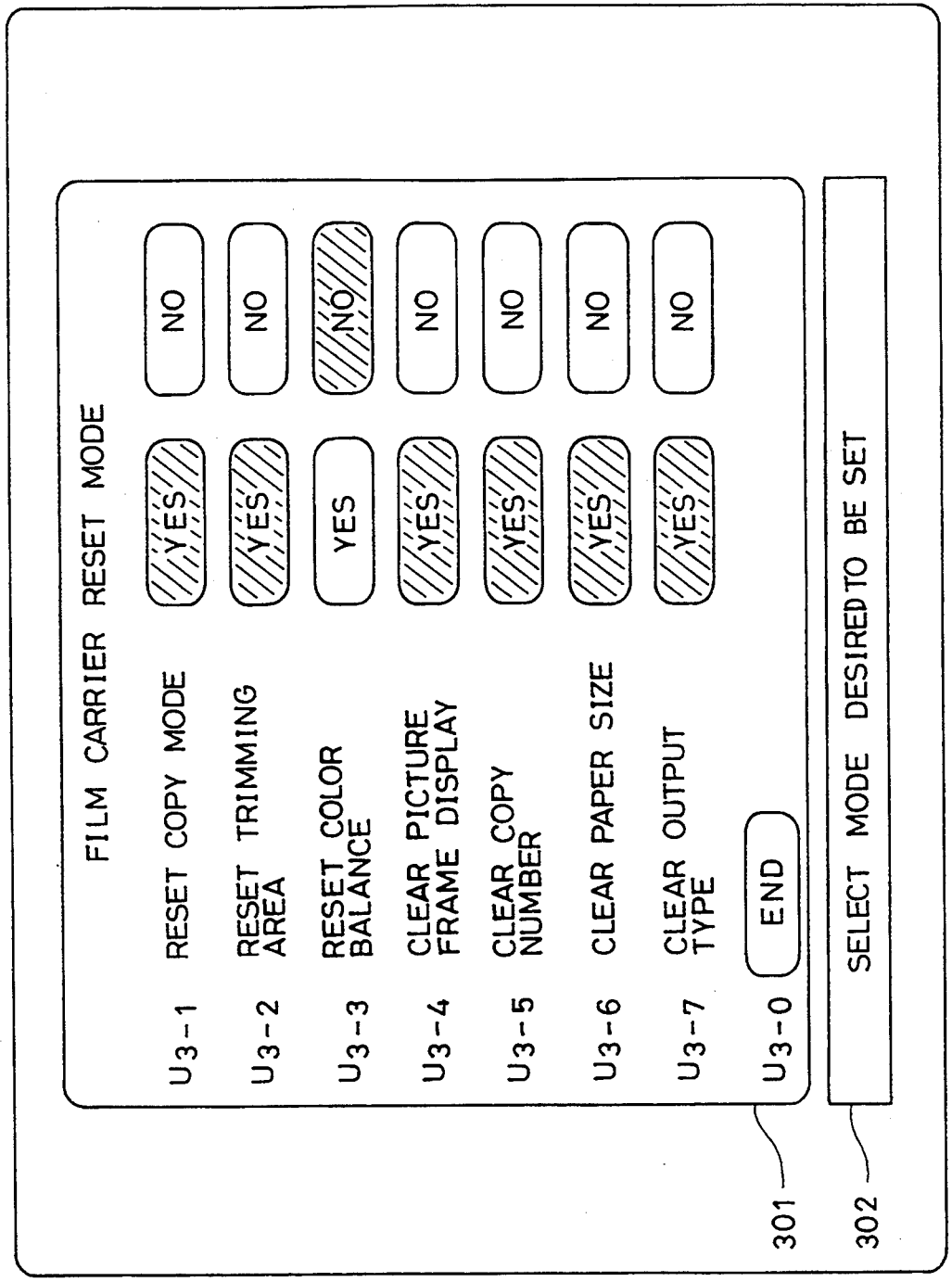

IMAGE PROCESSOR PERMITTING RESETTING OPERATION WHILE MAINTAINING DESIRED OPERATION MODE

BACKGROUND OF THE INVENTION

1. Field of the Invention

The present invention relates generally to image processors capable of operating in a plurality of operation modes, and more specifically, to an image processor capable of resetting operation while maintaining a desired operation mode.

2. Description of the Related Art

Various image processors by which various operation modes can be separately set for a plurality of items related to image processing are provided.

For example, in an apparatus reading an original image, a region for reading an image (trimming region) or an image reading density can be designated.

In an apparatus displaying on a picture frame an image based on image data, inversion/non-inversion for display, color balance, display magnification, etc. can be designated.

In an apparatus forming an image on paper, the number of sheets for one image, a position paper to form an image, the size of an image, color balance, concentration, the density of an image to be formed, etc. can be designated.

Furthermore, in an apparatus combining these functions, various operation modes created based on the combinations can be designated.

In each of the above-apparatuses, it is necessary to decide an operation mode at the time of activating the apparatus, and therefore initial modes are decided corresponding to the operation modes. A mode most likely to be used is usually employed as its initial mode.

Also in each of the above-described apparatuses, generally, a reset switch for returning set operation modes to an initial mode at a time.

When an apparatus is used, however, one sometimes desires to return one set operation mode to its initial mode while still maintaining a certain operation mode. A mode desired to be maintained and a mode desired to be returned to the initial mode are sometimes different depending upon uses.

For example, in an apparatus reading an original image and displaying the read image on a picture frame, the situation in which "color balance, etc. are desired to be reset for every exchange of original sheets, but the trimming region, etc. are desired to be maintained as they are for all the original sheets" takes place. In some cases, "for one original, color balance, a trimming region, etc. are desired to be returned to the initial mode, but the picture frame display, or the like are desired to be maintained intact".

In an apparatus for reading an original image and reproducing the read image on paper, as in the abovedescribed case, a mode desired to be maintained and a mode desired to be reset are present, and the respective modes can be changed depending upon uses.

SUMMARY OF THE INVENTION

It is therefore one object of the invention to reset one operation mode while maintaining a desired operation mode in an apparatus having a plurality of operation items and set to various operation modes for the various operation items for operating.

Another object of the invention is to permit a user to designate a reset item among a plurality of operation items in an image forming apparatus having a plurality of operation items and set to various operation modes for the various operation items for operating.

According to the invention, the above-described objects are achieved by an apparatus having a plurality of operation items and set to various operation modes for the operation items for operation. More specifically, in an apparatus according to the invention, the user can decide whether or not to maintain an operation mode set for each of a plurality of operation items (when the apparatus is reset to an initial mode). As a result, one operation mode can be reset while maintaining a desired operation mode in an apparatus having a plurality of operation items and set to various operations modes for various operation items for operating.

The above-described apparatus preferably includes an image forming apparatus.

As a result, the user can designate a reset item among plurality of operation items in an image forming apparatus having a plurality of operation items and set to various operation modes for the operation items for operating.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a view for use in illustration of an initial picture frame on the CRT display of the apparatus according to the embodiment;

FIGS. 11 and 12 are flow charts each showing part of a reset mode processing;

FIG. 25 is a view for use in illustration of a picture frame when a U3 film carrier reset mode is selected on a user set mode picture frame.

DESCRIPTION OF THE PREFERRED EMBODIMENTS

Now, embodiments of the invention will be described in conjunction with the accompanying drawings in the following order.

[1] Mechanism of Film Scanner
[2] Control Circuit of Film Scanner
[3] Control of Film Scanner

[1] Mechanism of Film Scanner

Figure 1:
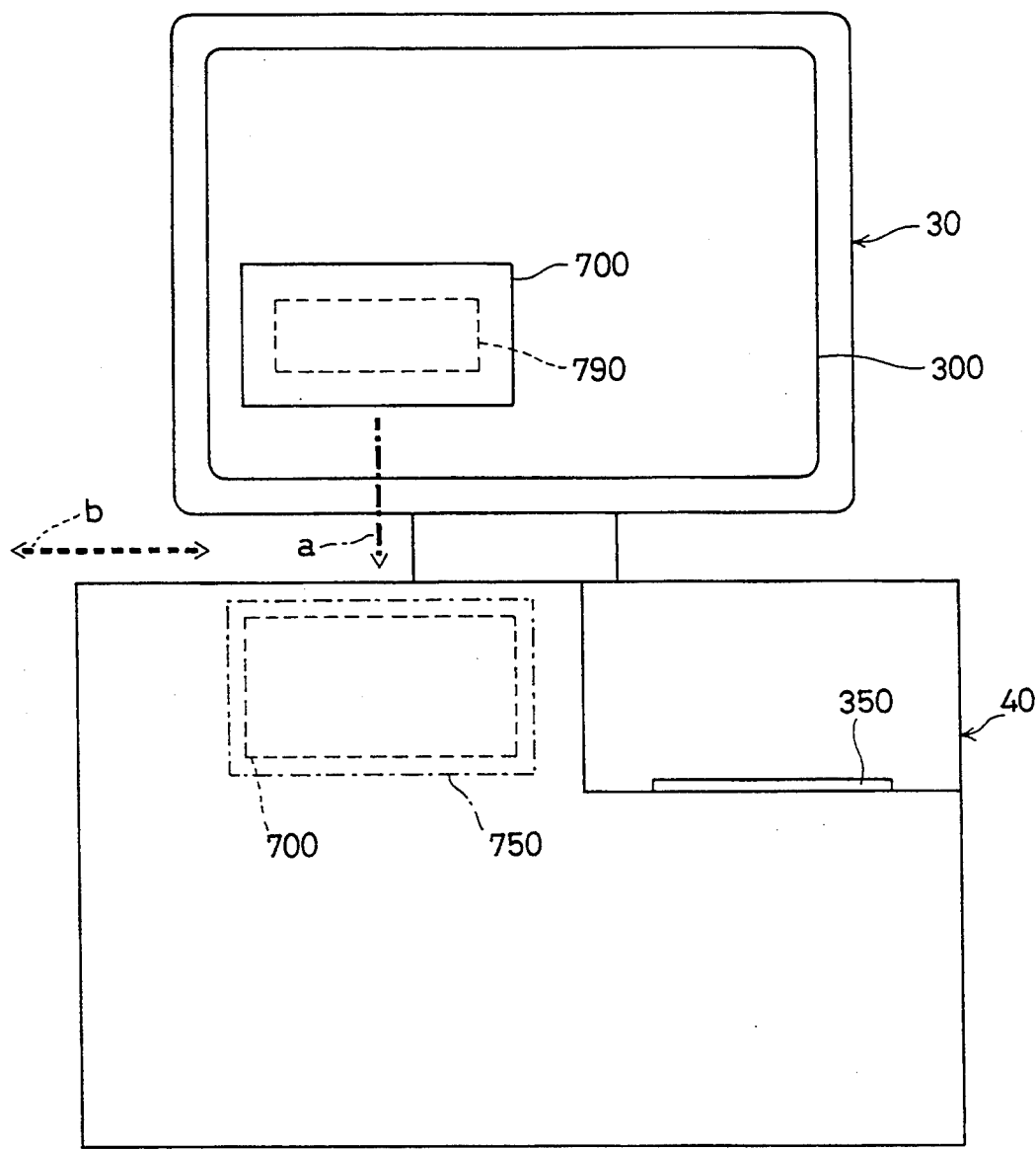
FIG. 1 is a view schematically showing the front of an apparatus according to an embodiment.

Referring to FIG. 1, a film scanner 30 scans the image of a film 790 (negative or positive) set in a main body 40 to display the resultant image on a CRT display 300, and transmits the image data to an external printer (digital color copying machine, etc.) to permit a full color image formed on paper.

[1-1] Mechanism for Detecting Film

There are four sizes of films which can be set in film scanner 30, 4×5 inch, 6 cm, 35 mm (roll film), 35 mm (mount=positive film for slide). Each of these films is set in a film carrier 700 prepared corresponding to each of film sizes and the kind of film (negative/positive), so that the image region of film 790 fits a carrier window 710 (see FIG. 5). Film 790 is set in a truck 750 in carrier 700 on the side of main body 40 as illustrated at chain dotted arrow a in FIG. 5. It is noted that a locking mechanism (not shown) is provided to film carrier 700 so that film 790 does not come off.

Figure 5:
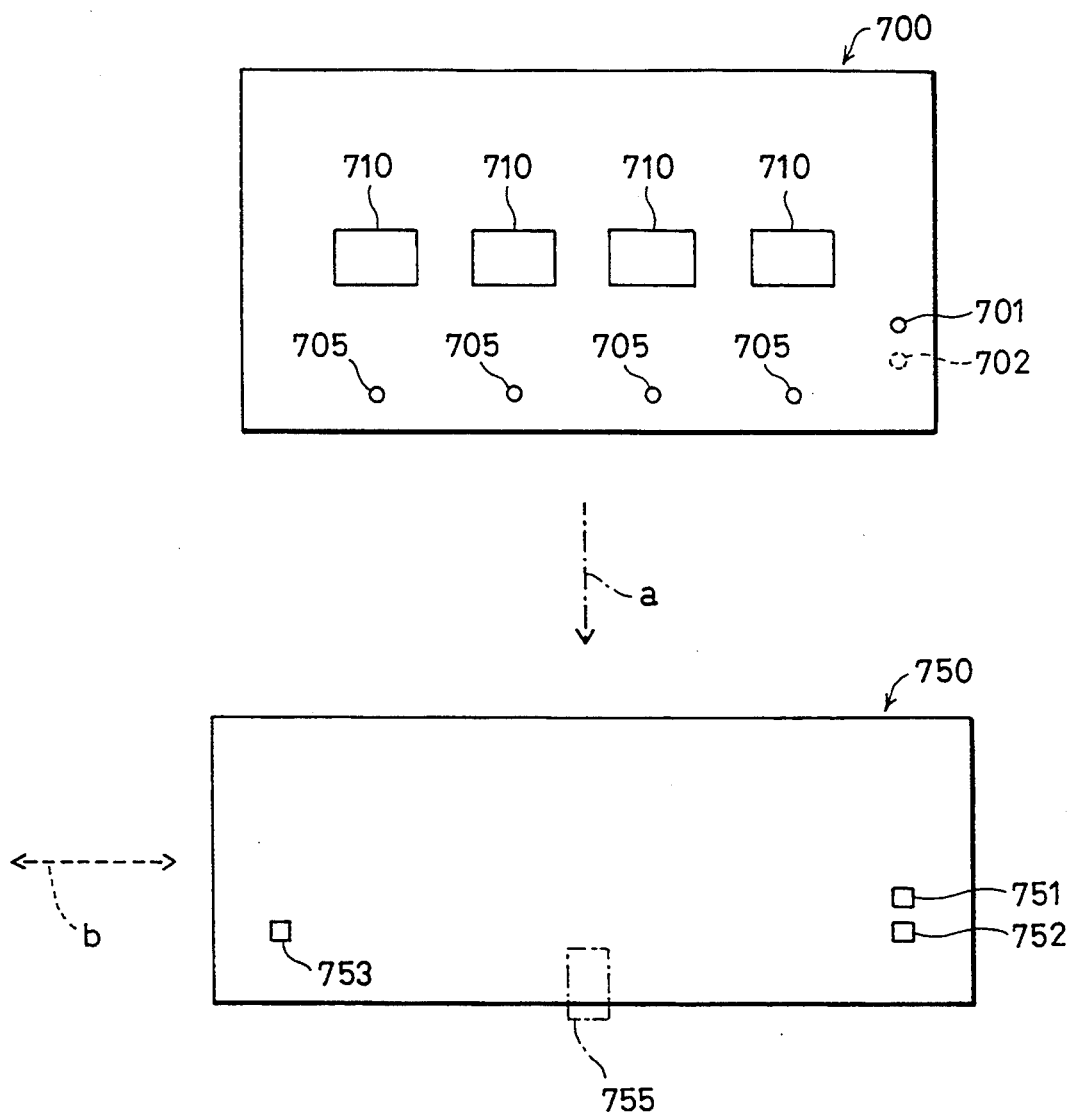
FIG. 5 is a view for use in illustration of a way of setting a film carrier.

When film carrier 700 is set in truck 750, the optical path of a transparent photosensor 753 for detecting the presence/absence of the carrier fixed in truck 750 as illustrated in FIG. 5 is blocked, and the output is inverted from a low level (0) to a high level (1). Thus, film carrier 700 being set in truck 750 is detected. When film carrier 700 is taken out from the truck, the level of the output of photosensor 753 is inverted from the high level (1) to the low level (0) and the inversion is detected (see $401 in FIG. 15, S401a in FIG. 16).

As illustrated in FIG. 5, at most two film kind detection holes 701, 702 are provided at prescribed positions depending upon the kind of film carrier 700. In truck 750, transparent photosensors for detecting the kind of film 751, 752 are provided at positions corresponding to film kind detection holes 701, 702. The kind of film carrier 700 (carrier for 4×5 inch film, 6 cm film, 35 mm roll film or 35 mm mount film, and the kind of film (negative/positive)) is determined by detecting change of the level of the outputs of photosensors 751, 752 from the high level (1) to the low level (0).

Truck 750 can manually be moved both rightward and leftward as indicated by arrow b in broken line in FIG. 1 and (FIG. 5) for frame registration of 35 mm film. When the carrier window 710 of a film image to be scanned is positioned at a prescribed scanning position by the rightward and leftward movement, the optical path of a transparent photosensor for carrier set detection 755 fixed to the side of main body 40 is formed through carrier set detection holes 705 provided immediately below the central position of carrier window 710. Through the optical path, the output level of photosensor 755 is inverted from the high level (1) to the low level (0). Thus, the positioning of carrier window 710 is detected.

[1-2] Picture Frame Display and Operation Input Unit

Figure 2A:
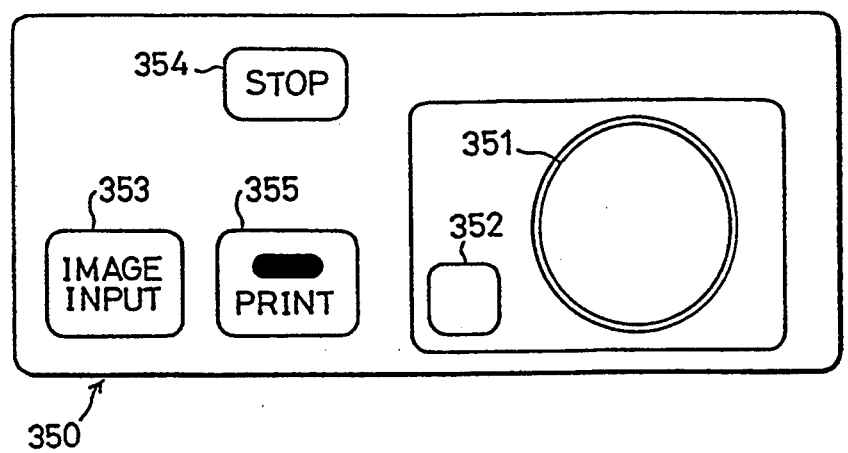
FIG. 2 is a view for use in illustration of the operation panel of the apparatus according to the embodiment.
Figure 2B:
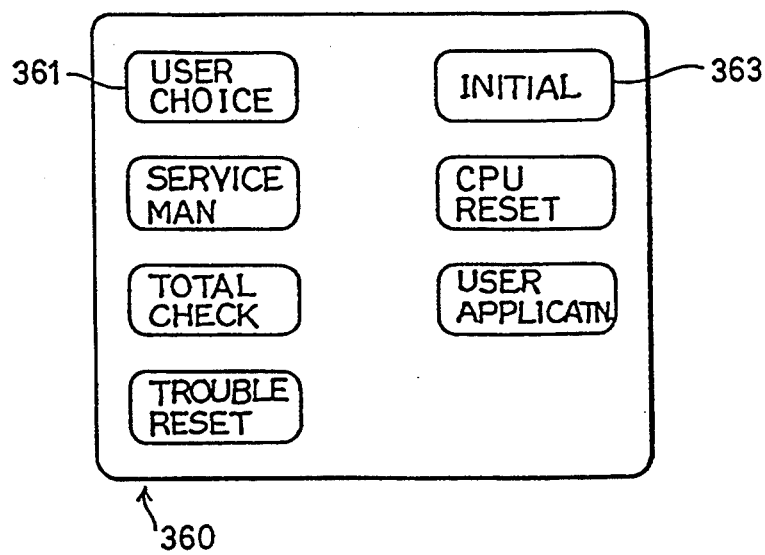

In the CRT display 300 of the present film scanner, as illustrated in FIG. 3, an image region 301 for displaying a scanned image or the like, a message region 302 for displaying various messages, and a sheet number display region 326 for displaying the number of sheets set for copying are provided. In addition, there is provided a region for switch buttons (image adjustment switch 305, trimming switch 300, expansion successive photographing switch 307, reduction successive photographing switch 308, output confirmation switch 309, output size switch 310, clear switch, reset switch 328, copy sheets increasing switch 327) each position of which designated by a cursor moved by operation of track ball 351 (FIG. 2) and which are turned on/off by operation of tab key (track ball input key) 352 (FIG. 2).

In message region 302, various messages such as an input instruction to an operator, data for shading correction being taken in, the film carrier being taken out, the kind of a film, the size of output paper and the like are displayed.

Each of the switch buttons is turned on/off by operating tab key (track ball input key) 352. For example, as will be described later, when a submenu is displayed by turning on image adjustment switch 305, image adjustment in color balance or the like can be set. A trimming mode is set by turning trimming switch 306. By turning on expansion successive photographing switch 307, a submenu is displayed and an output size can be set. By turning on reduction successive photographing switch 308, a reduction successive photographing mode is set. The relation between an image for printing and paper is displayed by turning on output confirmation switch 309. A submenu is displayed by turning on output size switch 310, and a paper size can be set. By turning on copy number increasing switch 327, the number of copies is increased or reduced. A copy mode is initialized by turning on reset switch 328. Items to be initialized and the copy mode will be later described in detail.

Film scanner 30 according to the embodiment is operated by in addition to the switch button region provided on CRT display 300, by a key switch group on an operation panel 350 provided on the top of main body 40, and by a key switch group on an internal panel 360 (FIG. 2) provided inside main body 40.

Provided on operation panel 350 are, as illustrated in FIG. 2 (a), track ball 351, tab key (track ball input key) 352, image input key 353 for instructing reading of an image and display of the image on a picture frame, a stop key 354 for instructing stopping operation, and a print key (copy key) 355 for instructing printing out in an externally connected printer.

Track ball 351 is a manually rotatable ball. By the rotation of track ball 351, the cursor on the CRT display 300 is moved. Tab key (track ball input key) 352 is a key for inputting coordinates designated by the cursor. More specifically, when the cursor instructs some switch button and tab key (track ball input key) 352 is operated, a mode or operation indicated by the switch button is selected. For example, if the cursor points out image region 301 in the trimming mode and tab key (track ball input key) 352 is operated, a trimming region can be set.

Provided on internal panel 360, as illustrated in FIG. 2 (b), a user choice key 361 for instructing setting of a user set mode, a service man key for instructing setting of a service man mode, a total check key for instructing display of the total number of printed sheets, a trouble reset key for resetting a trouble condition, an initial key 363 for executing an initial value setting processing, a CPU reset key for resetting CPU 400 (FIG. 4), and a user application key indicating a user application code.

[2] Control Circuit for Film Scanner

Figure 4:
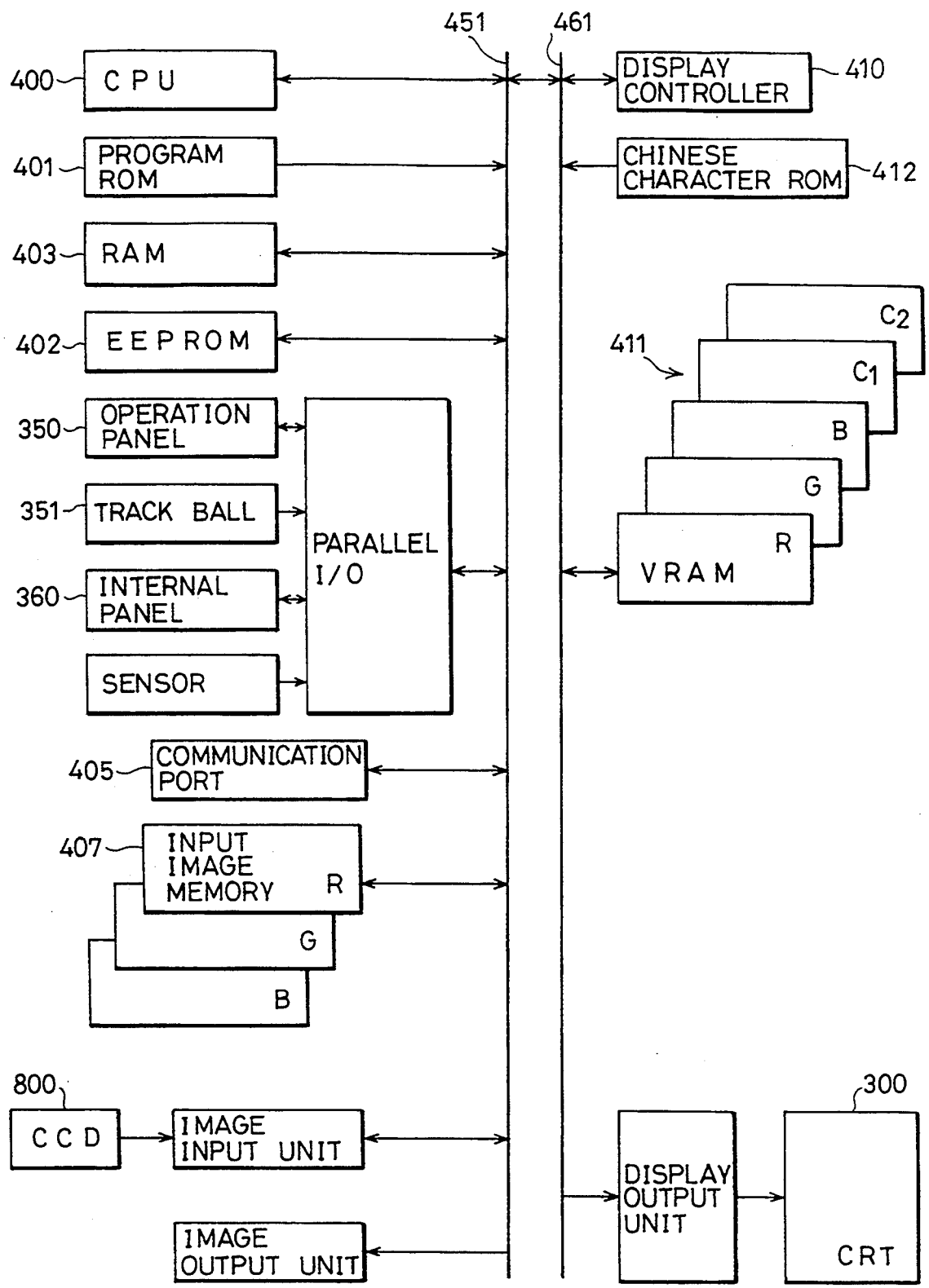
FIG. 4 is a block diagram showing the structure of the control circuit of the apparatus according to the embodiment.

Film scanner 30 is controlled by a control circuit shown in FIG. 4. More specifically, the film scanner is controlled by CPU 400 controlling the entire apparatus and by a display controller (AGDC) 410 controlling display on CRT display 300.

[2-1] CPU 400

Connected to CPU 400 through a CPU data bus 451 are a program ROM 401 storing control programs, a RAM 403 for temporarily storing variables and other data necessary for executing the programs, an EEPROM 402 for storing the initial mode and the like of each item, an input/output interface (parallel I/O) for inputting/outputting a signal to/from peripheral devices, a communication port 405 for communicating with an external printer, an image input unit for performing an inputting processing of an image signal read by an image sensor (CCD) 800, input image memories 407 each for R, G, and B storing image data input by the image input unit, and an image output unit for performing an editing processing of image data for print out.

The input/output interface (parallel I/O) is connected to operation panel 350, track ball 351, internal panel 360 shown in FIG. 2, the sensors shown in FIG. 5, and various other sensors (not shown) for detecting the state of the apparatus, or driving circuits and the like for driving the elements of the scanning optical system.

Figure 20:
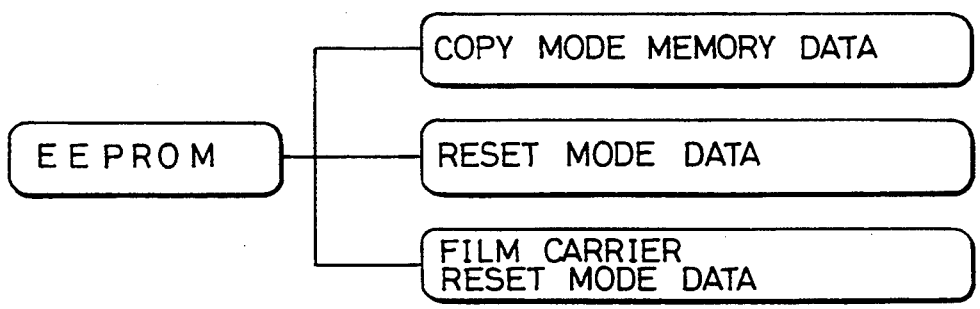
FIG. 20 is a representation for use in illustration of data stored in an EEPROM.

Data in program ROM 401 necessary for controlling the apparatus is written in EEPROM 402. The data shown in FIG. 20 can be rewritten by user operation. More specifically, the data which can be rewritten by user operation input are copy mode memory data for storing an initial mode set in a copy mode memory processing (S311) in FIG. 10, reset mode data for storing data set in a reset mode processing (S321), and film carrier reset mode data storing data set in a film carrier reset mode processing (S331 in FIG. 10).

Figure 21:
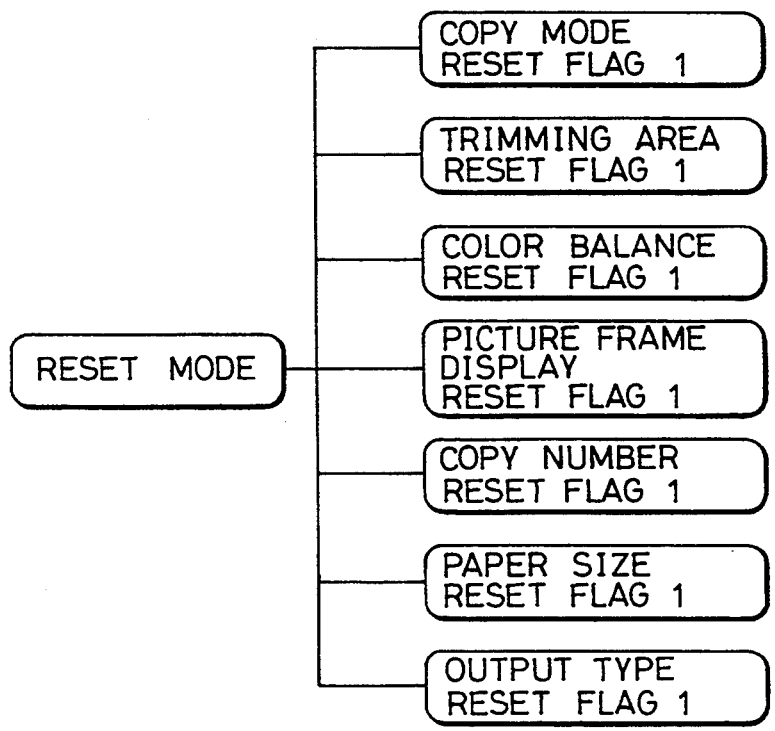
FIG. 21 is a representation for use in illustration of data stored in a reset mode.

Data rewritten in the reset mode processing (S321 in FIG. 10) is reset flags 1 for indicating whether or not to reset the set mode in response to reset button 328 on CRT display 300 being turned on. More specifically, as illustrated in FIG. 21, each of copy mode reset flag 1, trimming area reset flag 1, color balance reset flag 1, picture frame display reset flag 1, copy number reset flag 1, and output type reset flag 1 can be rewritten.

Figure 22:
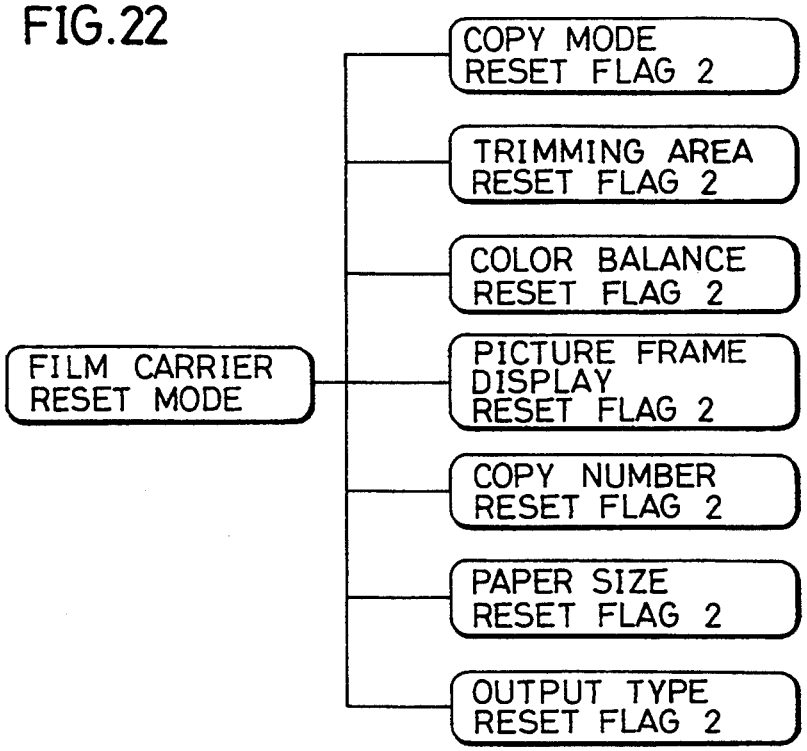
FIG. 22 is a view for use in illustration of data stored in a film carrier reset mode.

Data which can be rewritten in the film carriers set mode processing (S331) is reset flags 2 for indicating whether or not to reset the set mode when film carrier 700 is taken out from truck 750. More specifically, as illustrated in FIG. 22, each of copy mode reset flag 2, trimming area reset flag 2, color balance reset flag 2, image display reset flag 2, copy number reset flag 2, paper size reset flag 2, and output type reset flag 2 can be rewritten.

[2-2] Display Controller 410

Connected to display controller (AGDC) 410 through an AGDC data bus 461 are a Chinese character ROM 41, a VRAM (Video RAM) 411, a display output unit for performing an editing processing for displaying image data stored in VRAM (Video RAM) 411 onto CRT display 300 or the like.

VRAM 411 includes three image plane for color-separated R, G and B, two character planes C1 and C2 for fixed elements such as the switch buttons on CRT display 300 and moving display elements such as the trimming frame or the like, and therefore VRAM 411 has five planes all together.

It is noted that image data stored in input image memory 407 is transferred to and stored in the R, G, and B image plane of VRAM 411 under the control of display controller 410, and at that time, part of the image data is cut out, expanded, or reduced depending upon an instruction from CPU 400.

[3] Control of Film Scanner

Now, processing executed in CPU 400 will be described.

[3-1] Main Routine

Figure 6:
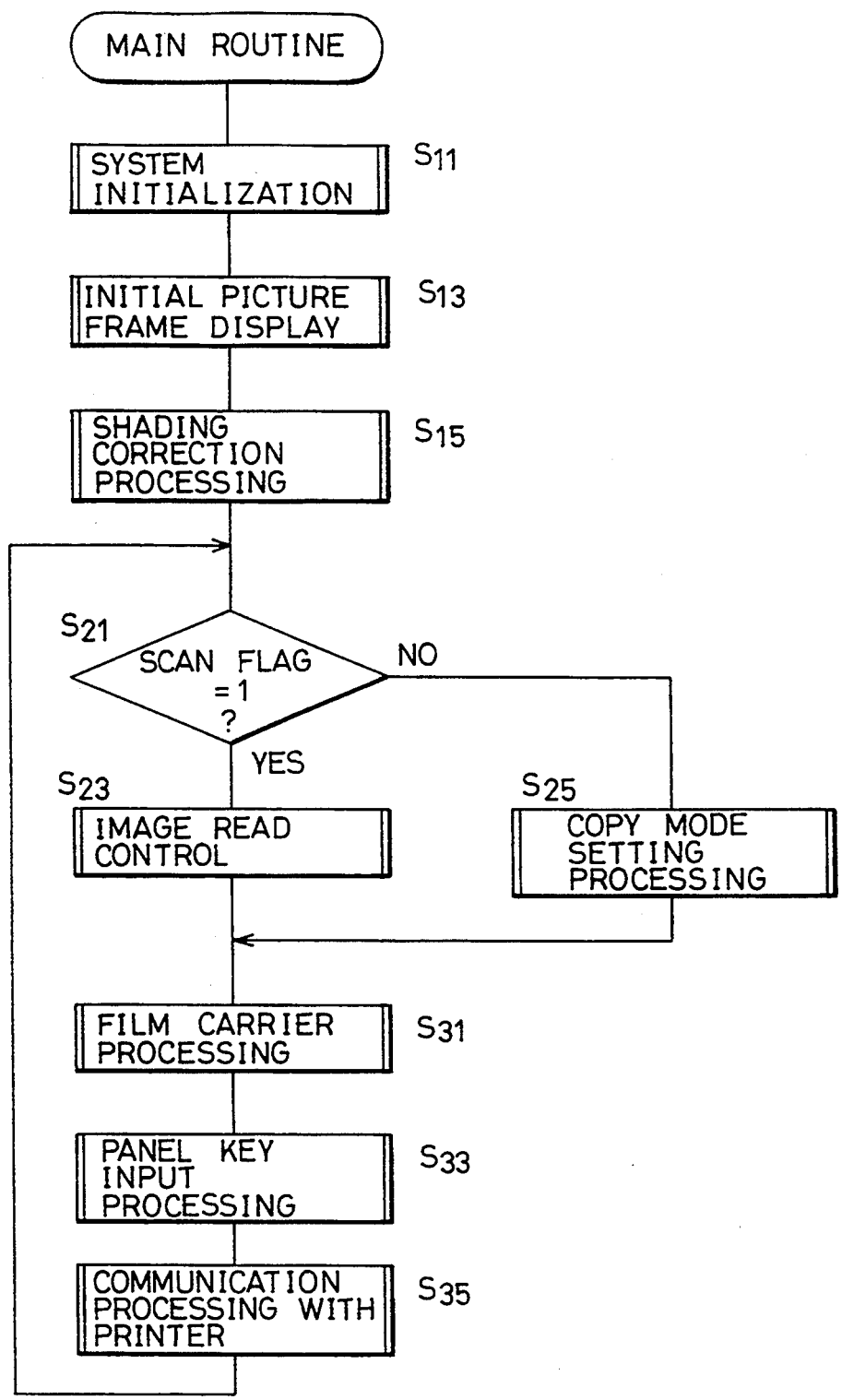
FIG. 6 is a flow chart for use in illustration of the main routine of a processing in the CPU shown in FIG. 4.

Referring to FIG. 6, the main routine of the processing executed CPU 400 will be described.

In CPU 400, the processing is initiated to, for example, by turning on the power supply.

Initialization of the system such as clearing RAM 403, resetting the peripheral devices or the like is performed first (S11). Then, an initial picture frame for setting a copy mode is displayed on CRT display 300 (S13).

Then, in order to initialize image sensor (CCD) 800 (see FIG. 4), a shading correction processing is performed (S15). The aforementioned processings constitute preparation for reading a film by film scanner 30.

Now, a scan flag is determined, and if the flag indicates 1 (S21:YES) an image reading control is executed (S23). The image reading control will be later described in detail in conjunction with FIG. 7.

Meanwhile, if the scan flag indicates 0 (S21:NO), a copy mode setting processing is executed (S25). The copy mode setting processing (S25) will be later described in detail in conjunction with FIGS. 15–17.

Whether the scan flag indicates 0 or 1, a film carrier processing (S31), a panel key input processing (S33) and a communication processing with the printer (S35) are executed. Then, the program returns to step S21.

In the film carrier processing (S31), a processing corresponding to setting/taking out of film carrier 700 is executed. The film carrier processing (S31) will be later described in detail in conjunction with FIG. 18.

In the panel key input processing (S33), an input operation of a key switch on operation panel 350 and internal panel 360 is accepted, and in response to the result, an image reading operation or the like is controlled, and data in EEPROM 402 can be rewritten. The panel key input processing (S33) will be later described in detail in conjunction with FIGS. 8–14.

In the communication processing with the printer (S35), a communication with the side of the externally connected printer is executed. For example, the result of setting of the copy mode on CRT display 300 or how copying proceeds is communicated.

[3-2] Image Reading Control

Figure 7:
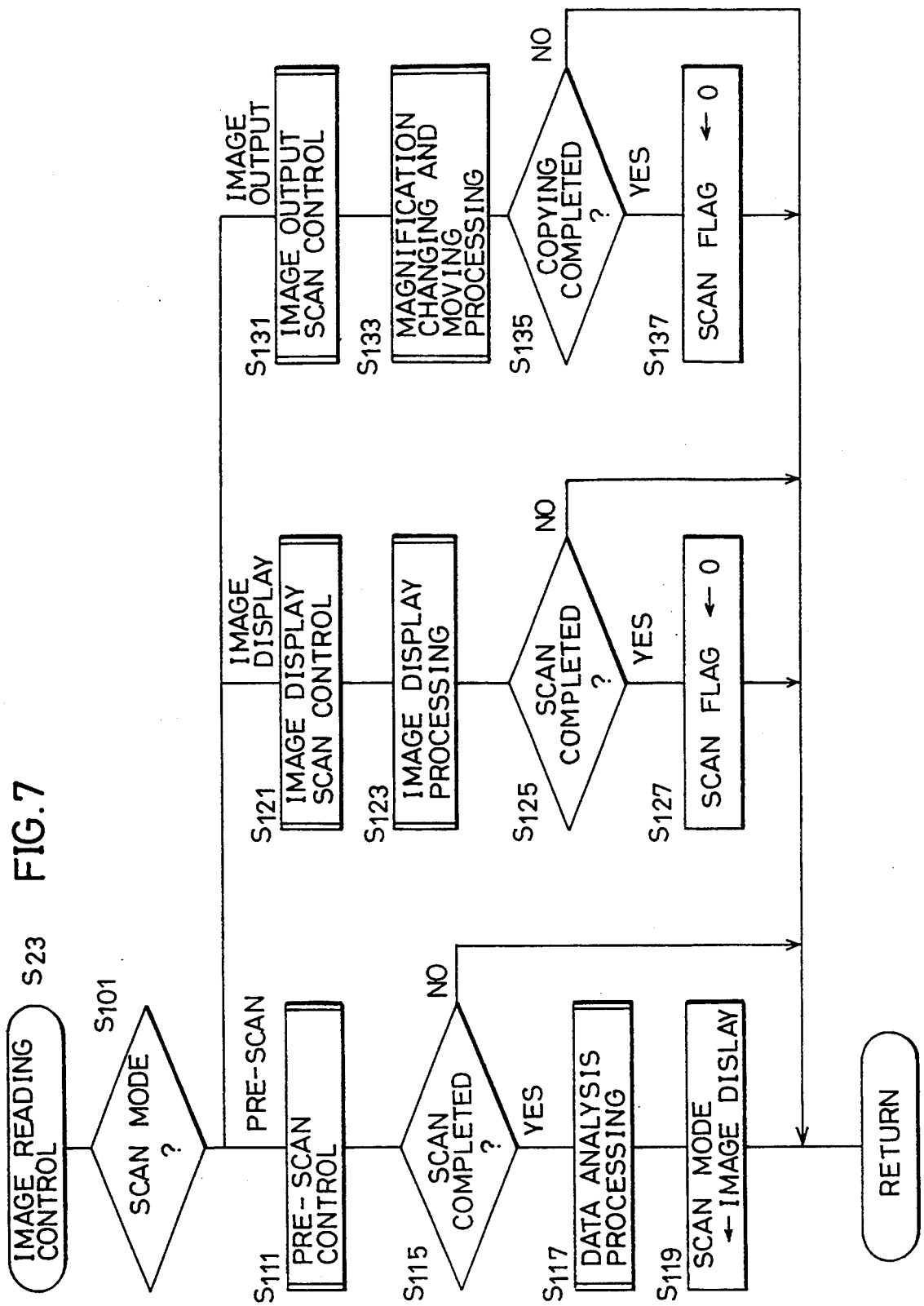
FIG. 7 is a flow chart showing image reading control.
Figure 8:
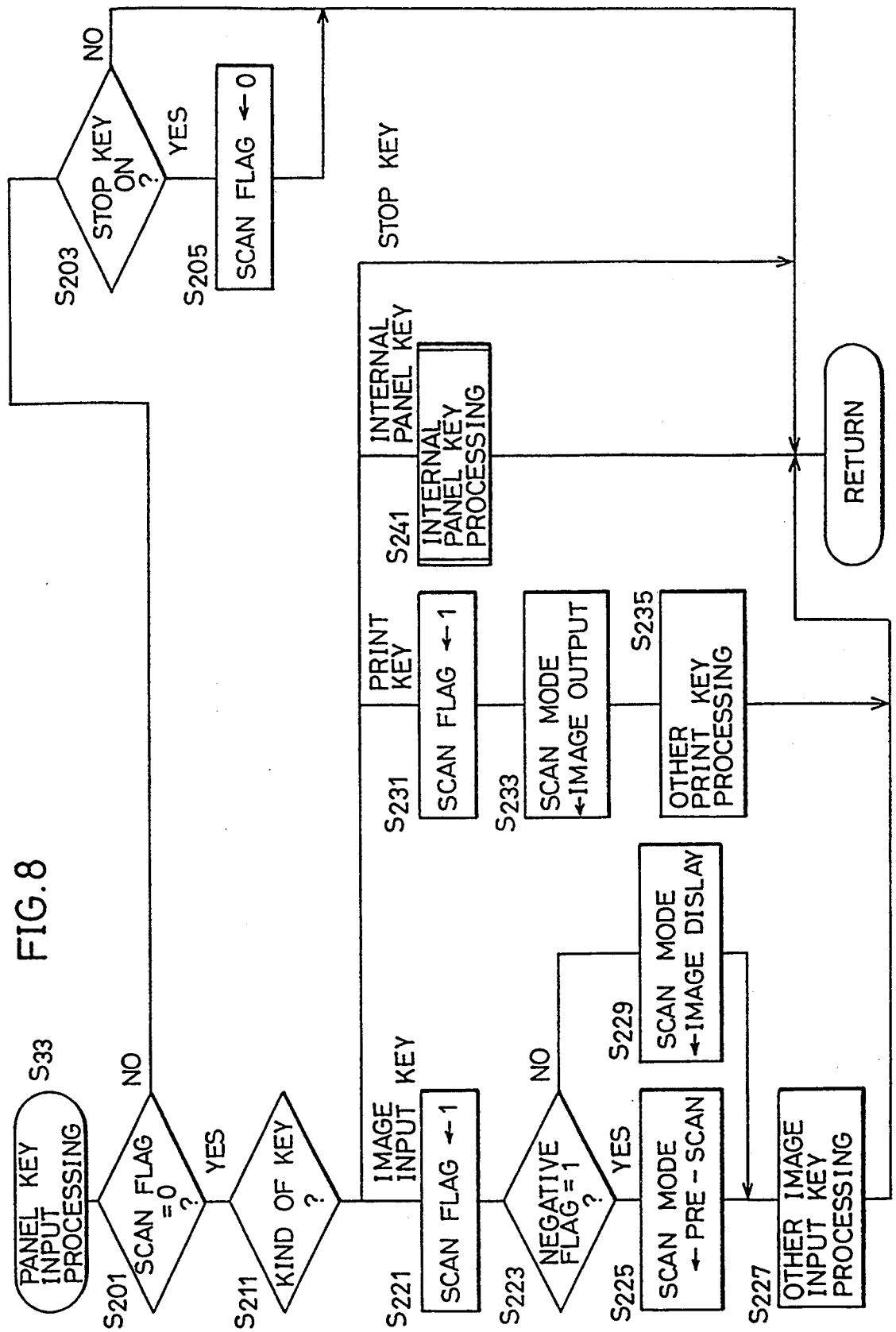
FIG. 8 is a flow chart showing a panel key input processing.

Now, the above-described image reading control (S23) will be described in conjunction with FIG. 7.

This processing is for permitting image sensor (color CCD) 800 to read light transmitted through film 790 set at a position for reading, and executed as follows in response to a scan mode.

(a) Pre-scan mode

When a pre-scan mode is set, in other words, when a negative film is set (see S223, S225 in FIG. 8), a pre-scan control (S111) is executed first. This is for reading the entire surface of the negative film and storing the read data in an image input memory.

Then, when the pre-scan is completed (Sill:YES) the image data read and stored in step Sill is analyzed (S117). This analysis processing is for permitting the image of the film to be read and displayed on the picture frame by changing the condition for reading the film. Thus, in the next step S119, the scan mode is set to an image display mode.

(b) Image display mode

When an image display mode is set, in other words, when a positive film is set (see S223, S229 In FIG. 8), or the above-described pre-scan for a negative is completed (S119), an image display scan control S121) and an image display processing (S123) are executed. The image display scan control (S121) includes reading a film, subjecting the read data to processings such as normalization, inversion of negative/positive, and then storing the resultant data in the image input memory. The reading of the negative film herein is performed under the condition for reading changed by the above-described pre-scan. The image display processing (S123) is a processing for permitting CRT display 300 to display an image based on stored image data.

Scanning for image display is performed only once. When the scanning for image display is completed (S125:YES), the scan flag is set to 0 (S127).

(c) Image output mode

When an image output mode is set, in other words when a printing operation is instructed by an operation input of print key 355 (S233 in FIG. 8), an image output scan control (S131) and a magnification changing and moving processing (S133) are executed.

In the image output scan control (S131), a film is read based on "READ START POSITION, READ END POSITION, SCAN SPEED, and SCAN NUMBER" in a copy mode set on the picture frame of CRT display 300. The read image data is subjected to magnification changing/moving of image in the scanning direction according to the magnification changing moving processing (S133).

It is noted that since converting RGB data into YMCK data for printing is executed in the externally connected printer, if a full color image is formed on paper, scanning must be performed four times in total (eight times at the time of reduction successive photographing). When the necessary number of scanning operations are completed, it is determined that the copying is completed (S135:YES), and the scan flag is set to 0 (S137).

[3-3] Panel Key Input Processing

Now, the above-described panel key input processing (S33) will be described in conjunction with FIGS. 8–14.

In this processing, reading operation is controlled or a mode is set in response to an operation input from operation panel 350 or internal panel 360.

The scan flag is determined in step S201.

If the result of the determination indicates that the scan flag is set to 1 (S201:N0), and an input from stop key 354 is detected (S203:YES), the scan flag is set to 0 (S205). Thus, the reading operation of the film is completed.

Meanwhile, the scan flag indicates 0 in step S201 (S201:YES), inputs from image input key 353, print key 355, and the key switch group on internal panel 360 are awaited (S211).

It is noted that if stop key 354 is operated in this awaiting period, the input is ignored.

[3-3-1] Input of Image Input Key or Print Key

In the awaiting period in step S221, if image input key 353 is input, the scan flag for controlling reading operation is set to 1 (S221), and the negative flag indicating whether the film is a negative film or a positive film is determined.

If the result of the determination indicates that the film is a negative film (S223:YES), the scan mode is set to the pre-scan mode (S225) in order to execute the abovedescribed pre-scan (see S111–S119). Meanwhile, if the result of the determination indicates that the film is a positive film (S223:N0), the scan mode is set to the image display mode (S229) in order to permit the film to be immediately read for display.

It is noted that step S227 indicates processings other than described above with respect to image input key 353, for example, a message is displayed on the image frame.

In the awaiting period in step S211, if print key 355 is input, the scan flag for controlling reading operation is set to 1 (S231). The scan mode is changed to the image output mode (S233) in order to permit the film to be read and data to be output to the printer.

It is noted that step S235 indicates processing other than described above with respect to print key 355, for example a message is displayed on the picture frame.

[3-3-2] Input of Key Switch on Internal Panel

Figure 9:
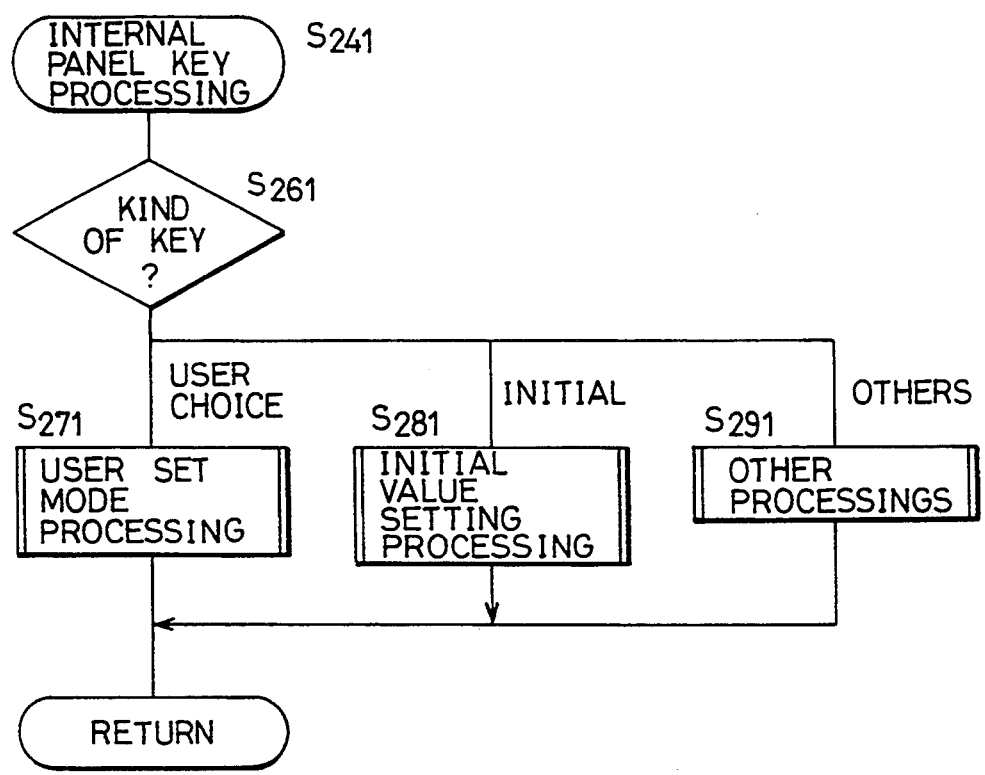
FIG. 9 is a flow chart showing an internal panel key processing.

In the awaiting period in step S211, if some key switch on internal panel 360 is input, a processing corresponding to the key switch is executed (S241). For example, if user choice key 361 is input, as illustrated in FIG. 9, the user setting mode processing (S271) is executed, and if initial key 363 is input, the initial value setting processing (S281) is executed. In the case of a key switch input other than the above-described, a processing corresponding to the key switch is executed (S291).

Figure 10:
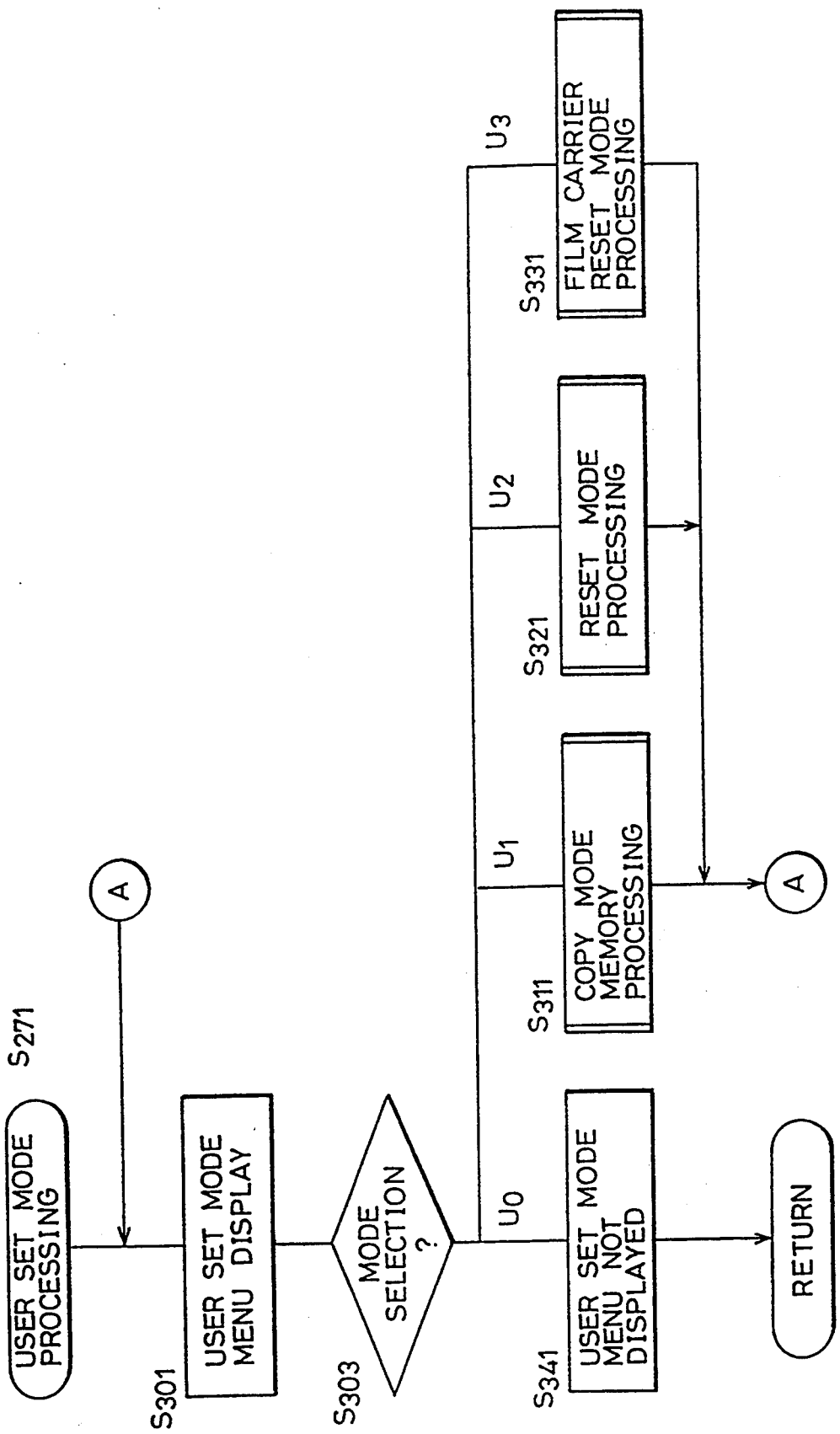
FIG. 10 is a flow chart showing a user set mode processing.

(d) User a set mode processing (FIG. 10)

Figure 23:
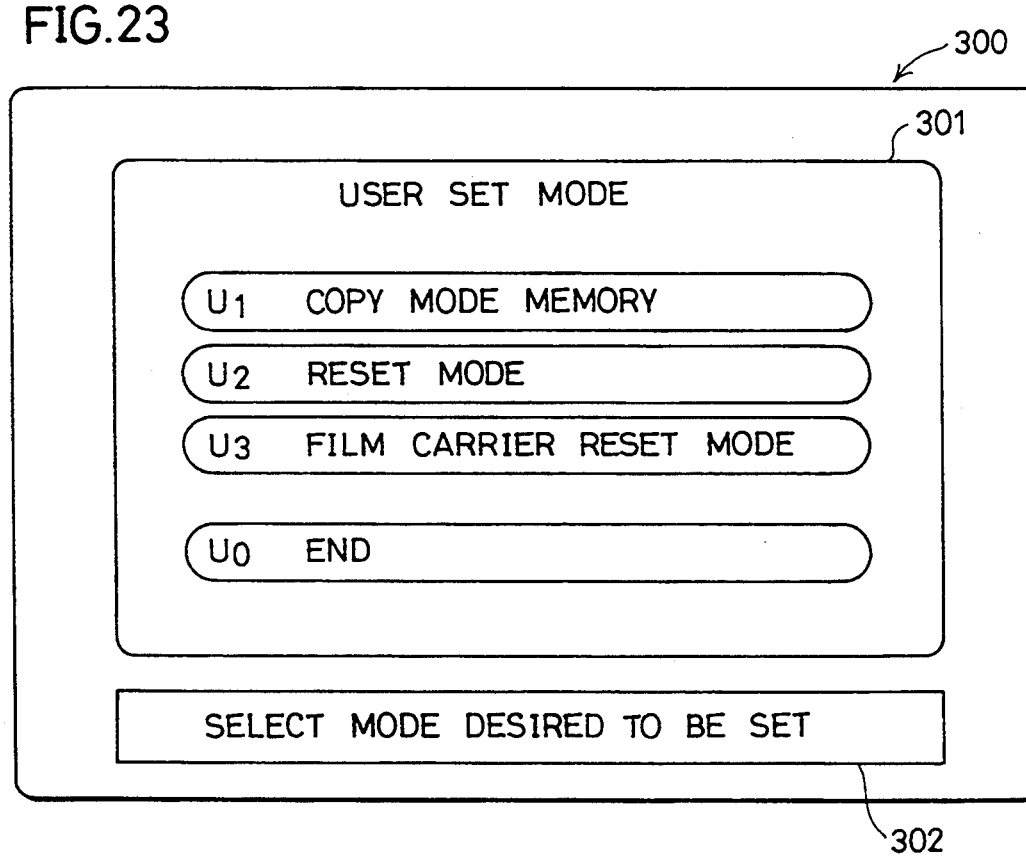
FIG. 23 is a view showing a user set mode picture frame on a CRT display.

In the user set mode processing (S271) executed in response to input of user choice key 361, a picture frame in FIG. 23 is displayed.

More specifically, as illustrated in FIG. 10, the picture frame indicates a state to select any one of three processings, a copy mode memory processing (S311:U1), a reset mode processing (S321:U2), and a film carrier reset mode processing (S331:U3). The selected processing is executed. After the execution, the picture frame once again indicates the waiting state (FIG. 23). It is noted that "end (U0)" is selected, the user set mode menu shown in FIG. 23 is erased (S341) and the program moves out of the user set mode processing (S271).

(e) Copy Mode Memory Processing (FIG. 10, S311)

In the picture frame shown in FIG. 23, the copy mode memory processing (S311) executed in response to the selection of "U1" is a processing for the user to arbitrarily set an initial value for each item, and the set mode data is written in the copy mode memory of EEPROM 402.

More specifically, data in program ROM 401 has been written in the copy mode memory of EEPROM 402 at the shipment of the film scanners. According to the copy mode memory processing, the data in the memory is rewritten.

The initial value for each item (operation mode) is set provided that the mode reset of the item is authorized in a reset processing (S581 in FIG. 16) executed in response to reset button 328 on the picture frame of CRT 300 being turned on, or in a film carrier reset processing (S715 in FIG. 18) executed in response to film carrier 700 being taken out from truck 750.

Figure 11:
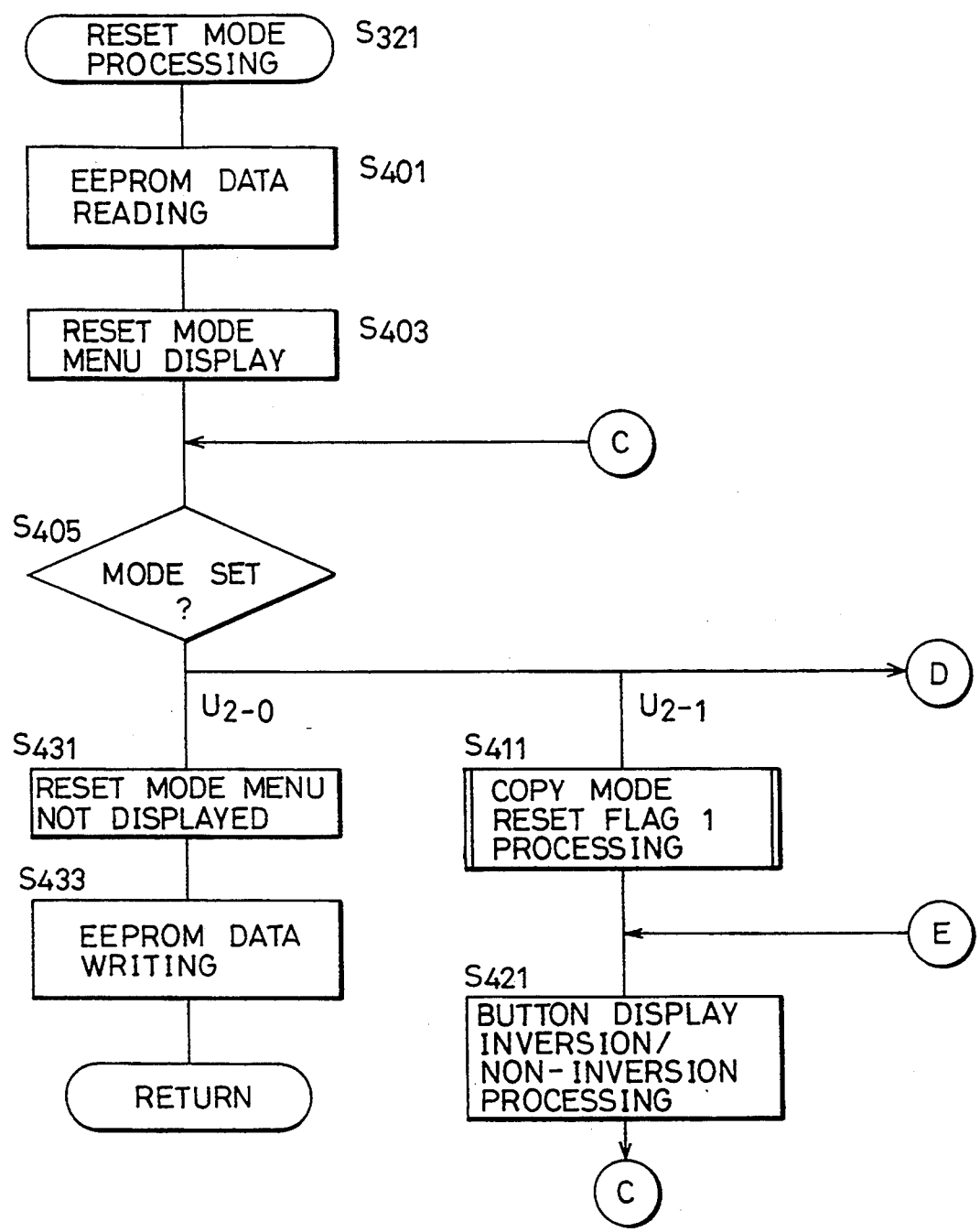

(f) Reset Mode Processing (FIGS. 11 and 12)

In the picture frame in FIG. 23, a reset mode processing (S321) executed in response to the selection of "U2" designates whether or not to authorize the reset mode processing (S581 in FIG. 16) executed in response to reset button 328 on CRT picture frame 300 being turned on. Designated data (data of reset flag=1) is written in the reset mode memory of EEPROM 402 when the program moves out of the reset mode processing.

Figure 24:
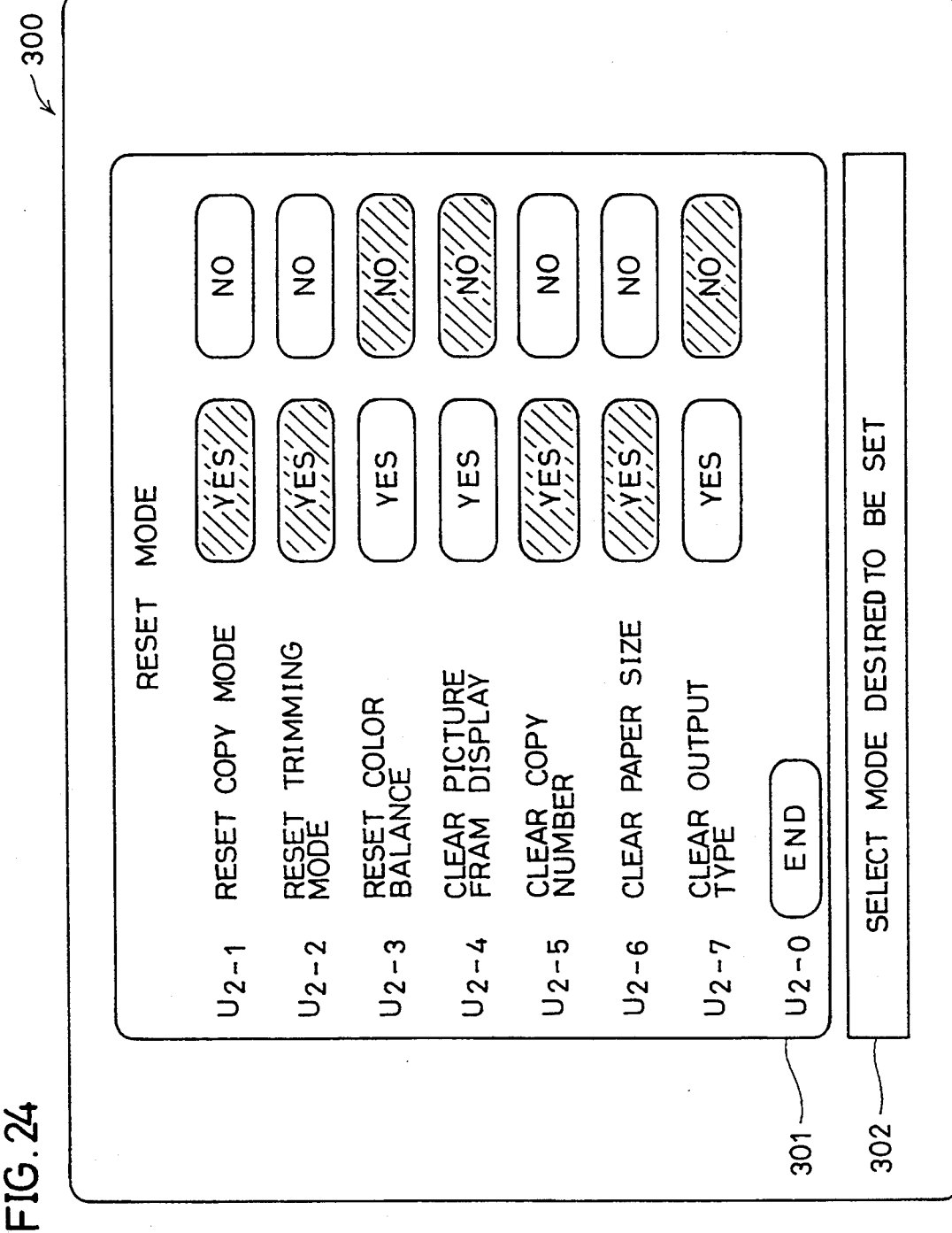
FIG. 24 is a view for use in illustration of a picture frame when a U2 reset mode is selected on a user set mode picture frame.

The data in the reset mode memory of EEPROM 402 is read out (S401), and a reset mode submenu is displayed as shown in FIG. 24 (S403).

In the picture frame in FIG. 24, it is designated whether to reset or clear "COPY MODE, TRIMMING AREA, COLOR BALANCE, PICTURE FRAME DISPLAY, COPY NUMBER, PAPER SIZE, OUTPUT TYPE" by the reset processing (S581 in FIG. 16) executed in response to reset buttons 328 on CRT picture frame 300 being turned on.

If, for example, as to "REST U2-1 COPY MODE", the cursor is moved to point out "YES", and then tab key (track ball input key) 352 is turned on, the copy mode reset flag processing (S411) is executed, and the copy mode reset flag 1 in FIG. 21 is set to "1". The indication "YES" is reversed for display.

The same procedure applies to "U2-2-U2-7" (S412-S417, PS421). It is noted that the contents of "COPY MODE, TRIMMING AREA, COPY NUMBER, PAPER SIZE" are designated to be reset or cleared, while the contents of "COLOR BALANCE, PICTURE FRAME DISPLAY, OUTPUT TYPE" are designated to be maintained as they are, despite reset button 328 on CRT picture frame 300 is turned on.

It is noted that if "U2-0 END" is turned on in the picture frame in FIG. 24, the reset mode menu in FIG. 24 is erased (S431). The result designated in the picture-frame in FIG. 24 is written in the reset mode memory of EEPROM 402 (see FIG. 21) (S433), and the program moves out of the reset mode processing (S321).

Figure 13:
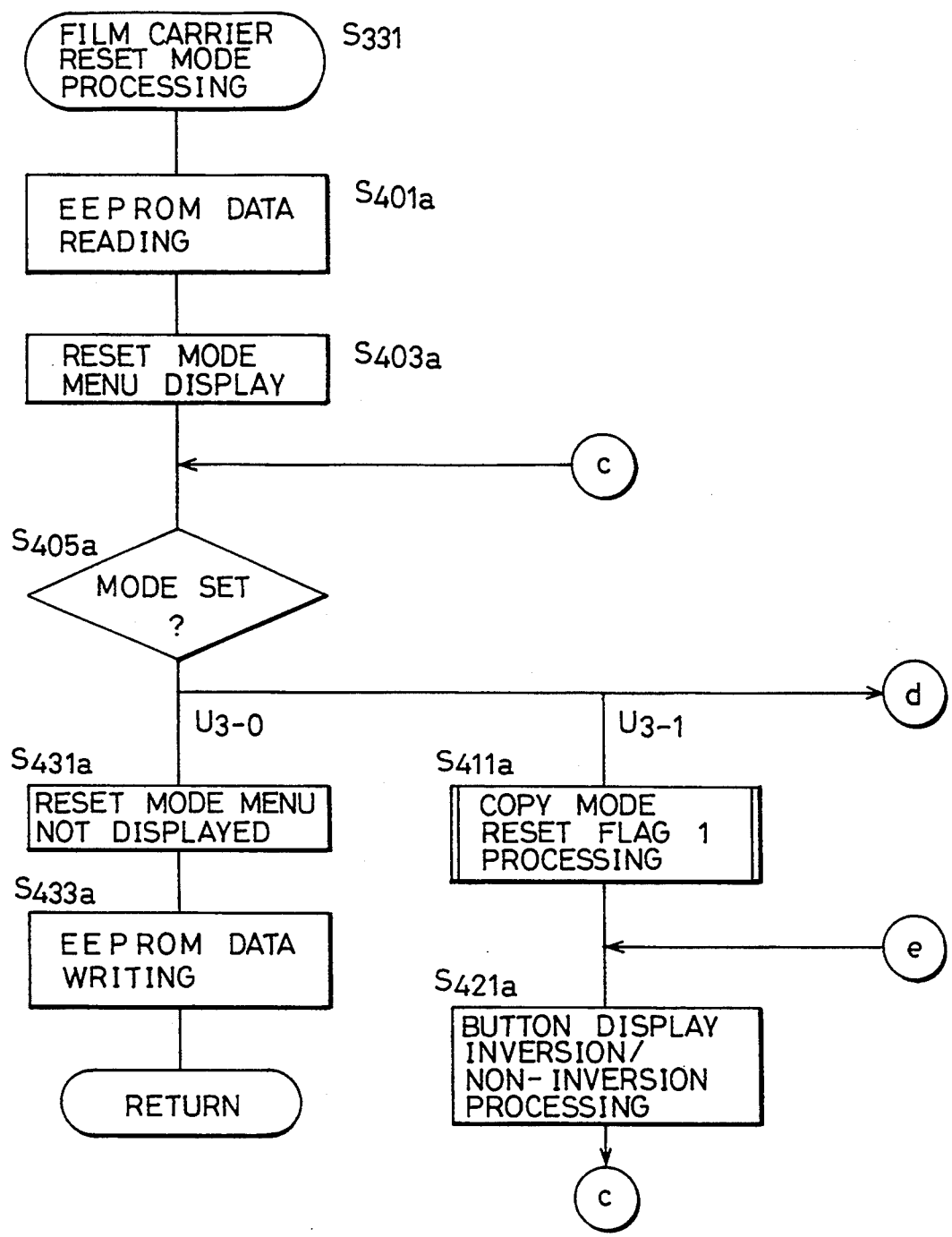
FIGS. 13 and 14 are flow charts each showing part of a film carrier reset mode processing.
Figure 14:
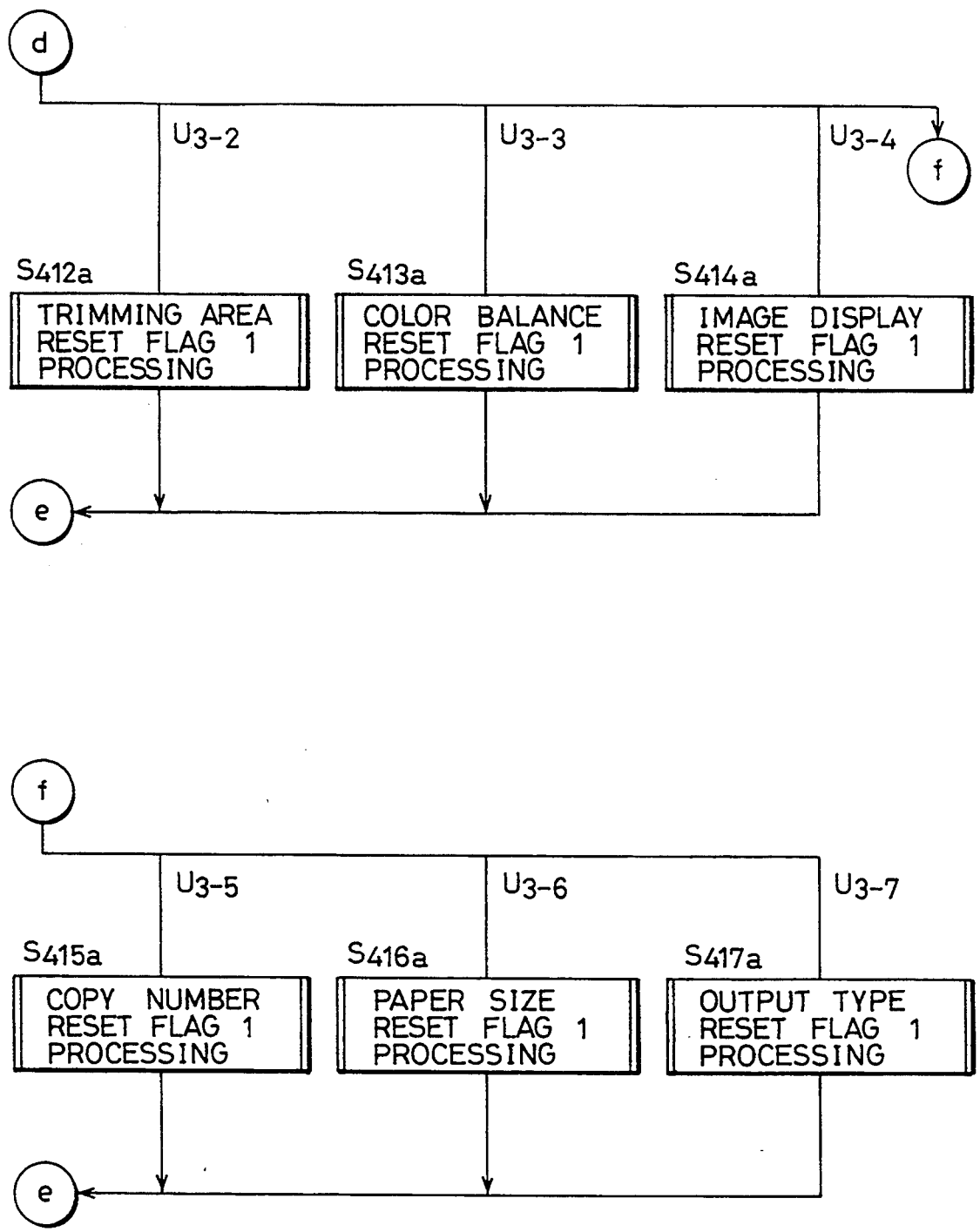

(g) Film Carrier Reset Mode Processing (FIGS. 13 and 14)

A film carrier reset mode processing (S331) is executed substantially in the same manner as the abovedescribed reset mode processing (321).

The difference is that according to the film carrier reset mode processing, the picture frame is displayed as illustrated in FIG. 25, and designated result is written in the film carrier reset mode memory (see FIG. 22).

(h) Initial Value Setting Processing (S281 in FIG. 9).

In the initial value setting processing (S281) executed in response to input of initial key 363, the data written in EEPROM 402 by the user designation in the copy mode memory processing (S311 in FIG. 10) is once again rewritten into the data in program ROM 401, in other words the data at the time of shipment.

Figure 15:
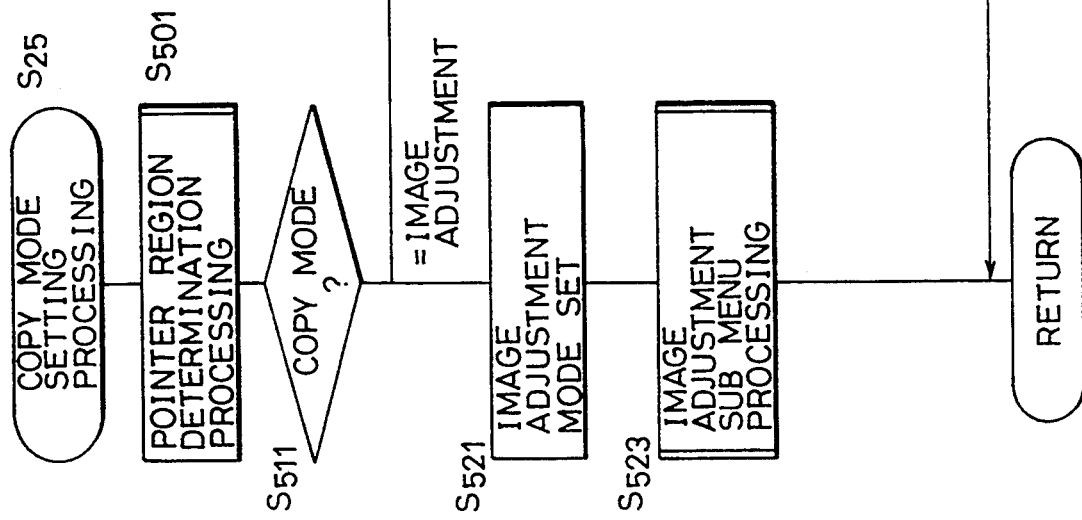
FIGS. 15 and 16 are flow charts each showing part of a copy mode setting processing.
Figure 16:
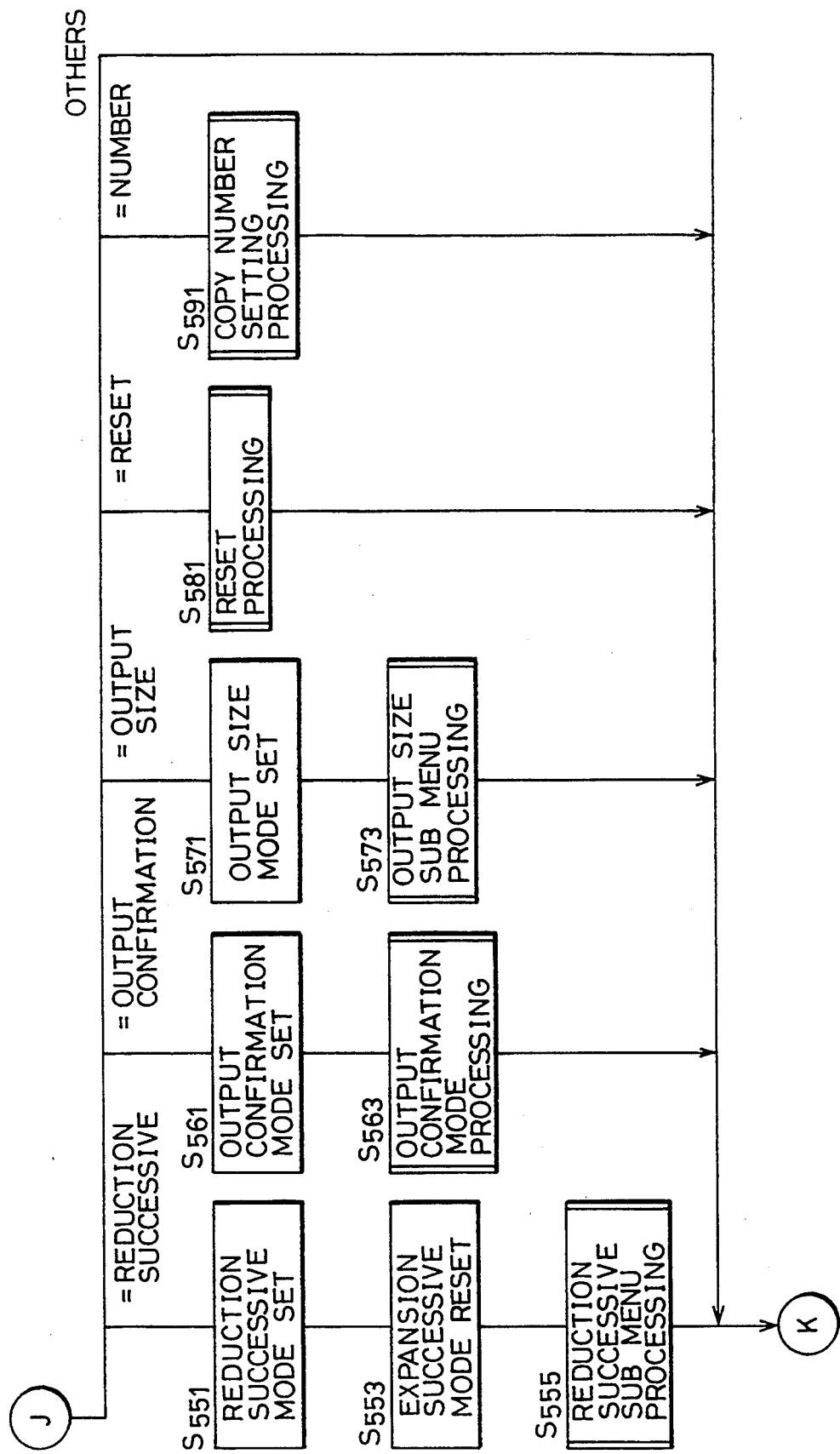
Figure 17:
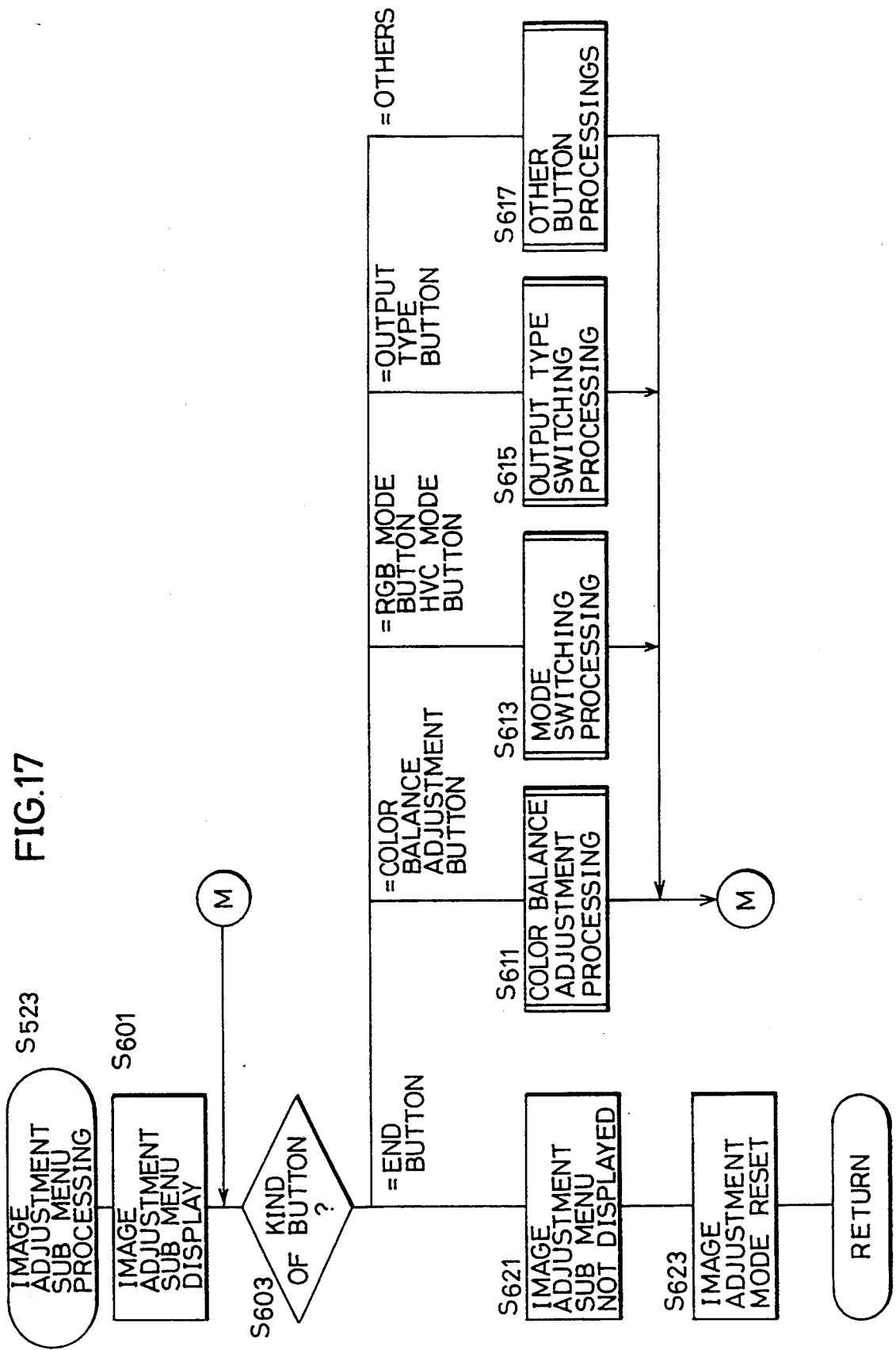
FIGS. 17 and 18 are flow charts each showing an image adjustment submenu.

[3-4] Copy Mode Setting Processing (FIGS. 15–17)

Now, the copy mode setting processing (S25) will be described.

In this processing, the following processing is executed in response to a switch button on CRT display 300 being turned on.

[3-4-1]

When image adjustment switch 305 is turned on, an image adjustment mode is set (S521), and an image adjustment submenu processing (S523) is executed. The image adjustment submenu processing will be described later, and setting of image concentration, adjustment of color balance or the like is performed as well.

When trimming switch 304 is turned on, a trimming mode is set (S531). A trimming frame default setting (S533) is executed, and a trimming region is set (S535).

When expansion successive photographing switch 307 is on, an expansion successive photographing mode is set (S541), and a reduction successive photographing mode which is not compatible with this mode is reset (S543). It is noted that the expansion successive photographing mode is a mode for expanding one image and printing out the image divisionally on a plurality of sheets of paper. An expansion successive photographing submenu processing (S545) for designating a size for expansion successive photographing is executed.

When reduction successive photographing switch 308 is turned on, the reduction successive photographing mode is set (S551), and the expansion successive photographing mode which is not compatible with this mode is reset (S553). It is noted that the reduction successive photographing mode is the mode for printing out the same image successively on a sheet of paper. A reduction successive photographing submenu processing (S555) for designating an output mode for reduction successive photographing is executed.

When output confirmation switch 310 is turned on, an output confirmation mode is set (S561), and the relation between an image to be printed out and paper is displayed on a monitor picture frame 300. An output confirmation mode processing (S563) is executed.

When output size switch size 310 is turned on, an output size mode is set (S571), and an output size submenu processing (S573) for setting the size of output paper is executed.

When reset switch 328 is turned on, a resetting processing (S581) is executed. More specifically, for the item whose reset flag 1 written in its reset mode region is "1", the operation mode is reset to the initial mode. For example, if the state of reset flag 1 is written as in FIG. 24, the contents of "COPY MODE, TRIMMING AREA, COPY NUMBER, PAPER SIZE" are reset to the initial modes. The initial modes are the mode written in EEPROM 402 as initial mode.

Accordingly, "the copy mode is reset to the initial mode" means that in the apparatus, the expansion successive photographing mode, reduction successive photographing mode, and the normal mode can be set, and the operation mode is returned from these modes to the mode written in EEPROM 402 as the initial mode (generally normal mode). The same applies to the trimming area, and the copy number. As for the paper size, the size of paper when the film carrier is set is, for example, set to paper feed entrance set at the priority paper feed entrance of the film size of the film carrier.

It is noted that of the reset items, the one which can be processed in the film scanner is executed, and information necessary in the printer is transmitted to the printer in step S35 in FIG. 6.

When number increasing switch 327 or number display 326 is turned on, a copy number setting processing (S591) is executed, and the number of output paper sheets is increased and confirmed.

[3-4-2] Image Adjustment Submenu Processing

Now, an image adjustment submenu processing (S523) will be described.

Figure 19:
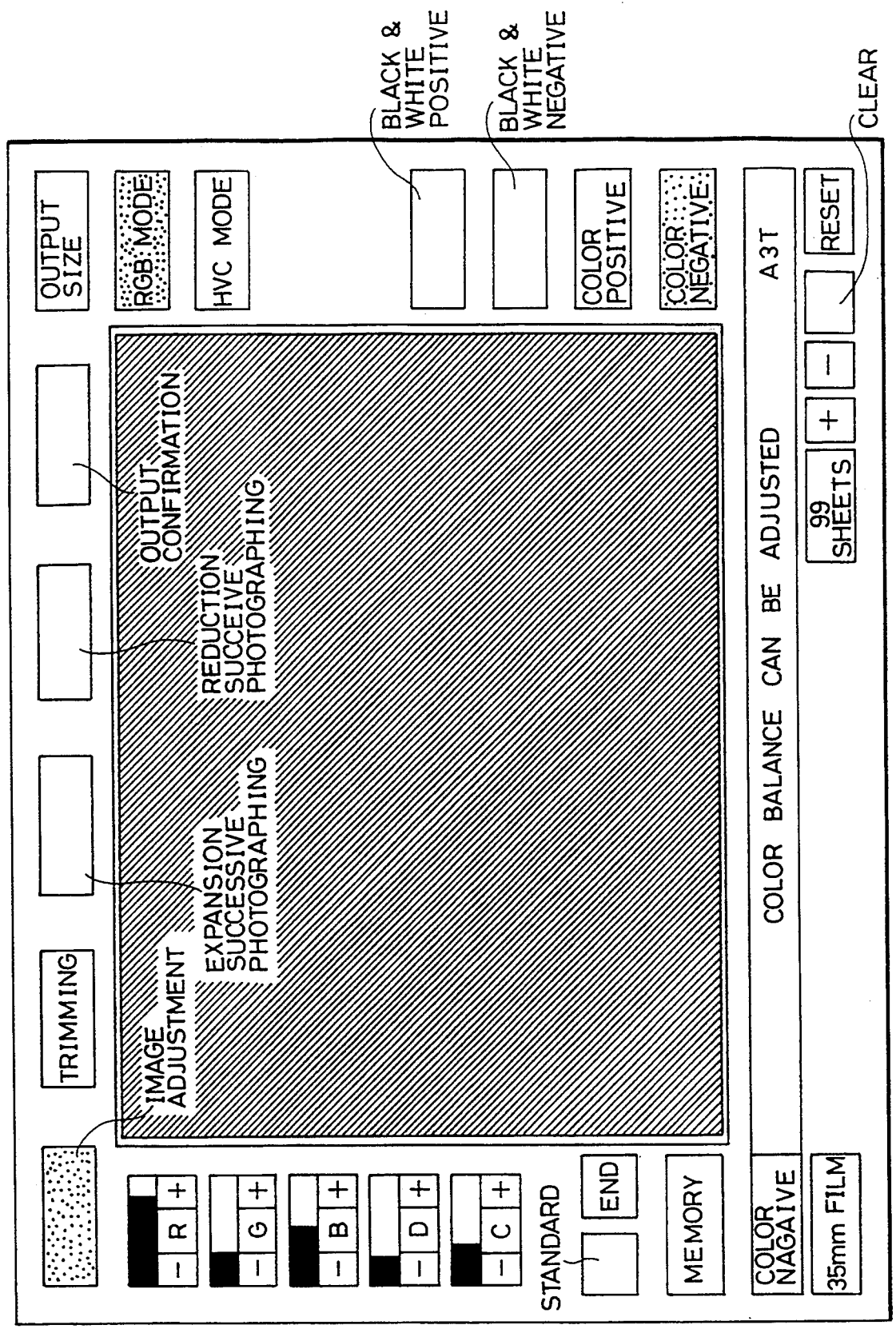
FIG. 19 is a view for use in illustration of an image adjustment picture frame on a CRT display.

In this processing, an image adjustment picture frame in FIG. 19 is displayed (S601), and the following processing is executed in response to the switch button displayed in the picture frame being turned on.

When, for example, a switch button for adjusting color balance is turned on, the color balance is adjusted (S611), and when an RGB mode button or an HVC mode button is turned on, a switching as to whether to perform color balancing with RGB or HVC is executed (S613). When the output type button is turned on, the type of an output image is switched, in other words switching between the negative and positive is performed (S615). Step S617 indicates the processing in response to another switch button being turned on. After the processing in response to these switch buttons, turning on/of a switch button is once again awaited.

Meanwhile, if the end button is turned on, the image adjustment submenu picture frame in FIG. 19 is erased (S611), the image adjustment mode is reset (S62), and the program moves out of the image adjustment submenu processing.

Figure 18:
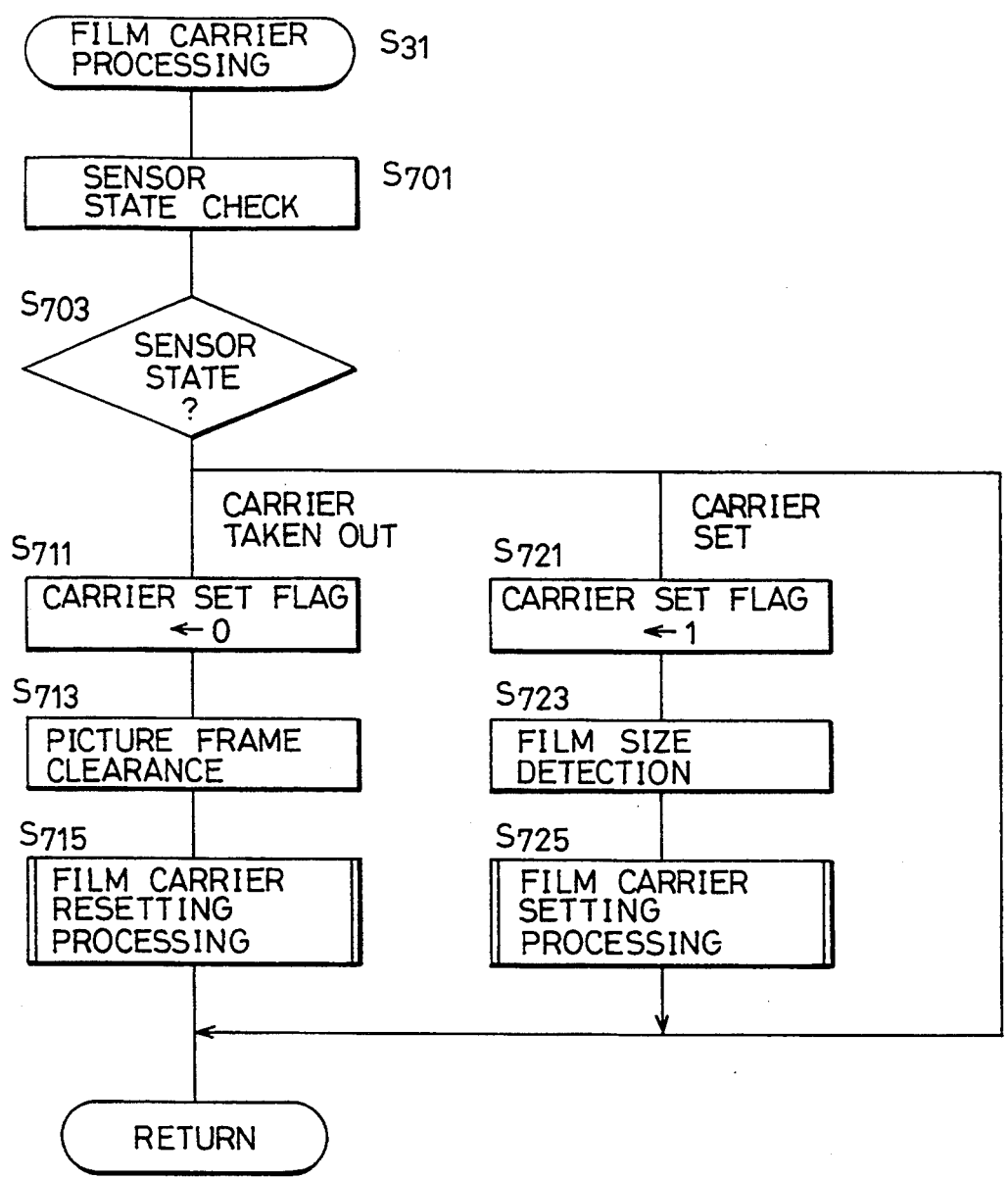

[3-5] Film Carrier Processing (FIG. 18)

Now, the film carrier processing (S31) will be described.

In this processing, the following processing is executed in response to setting/taking out of film carrier 700 in truck 750.

The state of the sensors is checked in step S701.

As a result, if it is detected that film carrier 700 is taken out from truck 750, the carrier set flag is set to 0 (S711), and the displayed picture frame of CRT display 300 is cleared (S713).

Then, the film carrier reset processing (S715) is executed. This processing is a processing similar to the reset processing (S581 in FIG. 16) with essential difference being that the reset flag referred to is "reset flag 2".

More specifically, for an item whose reset flag 2 written in each of film carrier reset mode regions (see FIG. 22) is "1", the operation mode is reset to the initial mode. If, for example, the state of reset flag 2 is written as shown in FIG. 25, the contents of "COPY MODE, TRIMMING AREA, PICTURE FRAME DISPLAY, COPY NUMBER, PAPER SIZE, OUTPUT TYPE" are reset to the initial mode. The initial mode herein is the mode written in EEPROM 402 as initial mode.

It is noted as to a reset of the output type that an output type is for example, set to a type set as a priority output type of film size of the carrier when the film carrier is set next.

Meanwhile, if it is detected that film carrier 700 is set in truck 750 in the checking operation in step S701, the carrier set flag is set to 1 (S271), and the size of the set film is detected (S723).

Then, a film carrier set processing (S275) is executed. It is noted when the size of a film is set, different output type is used for a film size depending upon user purposes, and therefore the default value of the output type is set depending upon a user set mode.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus having a plurality of operation items and capable of operation by setting said operation items to various operation modes from a fixed initial mode, comprising:

first initializing means for outputting first initializing signals;

second initializing means for outputting second initializing signals;

setting means for setting, for each operation item, whether to change the operation mode thereof to said initial mode or to maintain a present operation mode;

storing means for storing information indicating whether said operation mode is initialized or not for each of said operation items; and control means responsive to output of said first or second initializing signals for controlling said apparatus to initialize said operation mode of said items which are initialized according to said information of said storing means and to maintain said present operation mode of said items which are not initialized according to said information of said storing means, wherein said first initializing means outputs said first initializing signals responsive to an action of setting an original.

* * * * *